(12) United States Patent
Yu et al.

(10) Patent No.: US 11,140,546 B2
(45) Date of Patent: Oct. 5, 2021

(54) SECURITY PROCESSING METHOD AND RELATED DEVICE

(71) Applicant: HUAWEI TECHNOLOGIES CO., LTD., Guangdong (CN)

(72) Inventors: Yinghui Yu, Beijing (CN); Chenwan Li, Beijing (CN); Jiangwei Ying, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 152 days.

(21) Appl. No.: 16/054,569

(22) Filed: Aug. 3, 2018

(65) Prior Publication Data
US 2018/0343566 A1    Nov. 29, 2018

Related U.S. Application Data

(63) Continuation of application No. PCT/CN2016/073731, filed on Feb. 6, 2016.

(51) Int. Cl.
*H04W 12/08* (2021.01)
*H04W 12/041* (2021.01)
(Continued)

(52) U.S. Cl.
CPC ......... *H04W 12/041* (2021.01); *H04W 12/08* (2013.01); *H04W 12/106* (2021.01);
(Continued)

(58) Field of Classification Search
CPC ..... H04W 12/08; H04W 76/27; H04W 76/10; H04W 12/10; H04W 24/02; H04W 12/04;
(Continued)

(56) References Cited

U.S. PATENT DOCUMENTS

| 2002/0066011 A1* | 5/2002 | Vialen | H04W 12/121 |
| | | | 713/150 |
| 2010/0115275 A1* | 5/2010 | Suh | H04W 12/08 |
| | | | 713/168 |

(Continued)

FOREIGN PATENT DOCUMENTS

| CN | 101483865 A | 7/2009 |
| CN | 101686233 A | 3/2010 |

(Continued)

OTHER PUBLICATIONS

3GPP TR 33.868 V12.1.0 (Jun. 2014),3rd Generation Partnership Project;Technical Specification Group Services and System Aspects; Study on security aspects of Machine-Type Communications (MTC) and other mobile data applications communications enhancements(Release 12),total 116 pages.

(Continued)

*Primary Examiner* — Abu S Sholeman
(74) *Attorney, Agent, or Firm* — Kilpatrick Townsend & Stockton LLP

(57) ABSTRACT

Embodiments of the present invention disclose a security processing method and a related device. The method may include: receiving, by a base station, security-processed target data sent by user equipment UE; sending, by the base station, security request information of the UE to a core network device; and receiving, by the base station, security response information returned by the core network device, where the security response information includes security parameter information of the UE and/or security-deprocessed target data. According to the present invention, during data transmission between the UE and the base station, not only data security can be ensured, but also low power consumption can be ensured.

20 Claims, 5 Drawing Sheets

(51) Int. Cl.
*H04W 12/106* (2021.01)
*H04W 76/27* (2018.01)
*H04W 76/10* (2018.01)
*H04W 24/02* (2009.01)
*H04W 4/70* (2018.01)
*H04W 52/02* (2009.01)

(52) U.S. Cl.
CPC .......... *H04W 24/02* (2013.01); *H04W 76/10* (2018.02); *H04W 76/27* (2018.02); *H04W 4/70* (2018.02); *H04W 52/0261* (2013.01); *Y02D 30/70* (2020.08)

(58) Field of Classification Search
CPC .............. H04W 4/70; H04W 52/0261; H04W 12/0401; H04W 12/1006; H04W 12/00; Y02D 70/00; H04L 9/08; H04L 9/00; H04L 29/06; H04L 9/12; H04L 9/32; G06F 9/455
See application file for complete search history.

(56) References Cited

U.S. PATENT DOCUMENTS

| | | | | |
|---|---|---|---|---|
| 2010/0316223 | A1* | 12/2010 | Blom | H04L 63/062 380/278 |
| 2011/0201305 | A1* | 8/2011 | Buer | H04M 3/42357 455/410 |
| 2013/0301611 | A1 | 11/2013 | Baghel et al. | |
| 2014/0233735 | A1* | 8/2014 | Zhang | H04L 9/12 380/270 |
| 2015/0082393 | A1* | 3/2015 | Chen | H04W 12/0431 726/4 |
| 2016/0094542 | A1* | 3/2016 | Lee | H04L 63/0823 726/7 |
| 2017/0169429 | A1* | 6/2017 | Chen | H04W 4/50 |
| 2017/0318452 | A1* | 11/2017 | Hahn | H04W 8/26 |
| 2018/0007590 | A1* | 1/2018 | Karout | H04W 74/0833 |
| 2018/0084452 | A1 | 3/2018 | Griot et al. | |

FOREIGN PATENT DOCUMENTS

| | | |
|---|---|---|
| CN | 102932784 A | 2/2013 |
| CN | 103813300 A | 5/2014 |
| CN | 103841547 A | 6/2014 |
| EP | 3198982 A1 | 8/2017 |

OTHER PUBLICATIONS

Form PCT/ISA/237, Written Opinion dated Nov. 4, 2016 in corresponding PCT Application No. PCT/CN2016/073731 (4 pages).

Forms PCT/ISA/210, PCT/ISA/220, International Search Report dated Nov. 9, 2016 in corresponding PCT Application No. PCT/CN2016/073731 (7 pages).

International Search Report dated Nov. 9, 2016 in corresponding International Patent Application No. PCT/CN2016/073731.

3GPP TR 23.887 V12.0.0 (Dec. 2013)3rd Generation Partnership Project;Technical Specification Group Services and System Aspects;Study on Machine-Type Communications (MTC) and othermobile data applications communications enhancements(Release 12), total 151 pages.

* cited by examiner

SECURITY PROCESSING METHOD AND RELATED DEVICE

CROSS-REFERENCE TO RELATED APPLICATIONS

This application is a continuation of International Application No. PCT/CN2016/073731, filed on Feb. 6, 2016, the disclosure of which is hereby incorporated by reference in its entirety.

TECHNICAL FIELD

Embodiments of the present invention relate to the communications field, and more specifically, to a security processing method and a related device.

BACKGROUND

With rapid development of wireless communications technologies, people are no longer satisfied with only person-to-person communication. Therefore, an Internet of Things (IoT) technology emerges, and market demand thereof grows rapidly. On the IoT, machine-to-machine transfer of information and data through a wireless network is referred to as machine-to-machine (M2M) communication for short. M2M communication is an important direction of IoT development.

Most M2M devices are relatively small and exquisite systems powered by batteries. For example, a smart metering system needs to perform periodic monitoring and reporting on usage of water, electricity, gas, or the like, and a smart metering service is generally a small data packet reporting service, featuring a small transmission data amount, an obvious service periodicity, low power consumption, and a large terminal quantity. Currently, there are mainly two transmission solutions to this type of service. One is a control plane (CP) transmission solution, and the other is a user plane (UP) transmission solution. For example, when the CP-based transmission solution is used, data is carried in a non-access stratum (NAS) data packet (such as a NAS PDU information element) in radio resource control (RRC) connection setup complete signaling and sent, and there is no need to additionally use an air interface to create a bearer for transmitting data. Therefore, there is no air interface related security processing procedure either, that is, there is no need to perform a security operation at a access stratum (AS).

However, for example, in existing RRC signaling, there is access stratum (AS) security protection for both signaling and data transmitted after an RRC connection is established. However, in the CP transmission solution, because no security operation is performed at the AS, there is a security risk for a user, especially in measurement report signaling or the like. However, if an AS security protocol is used between user equipment (UE) and an evolved NodeB (eNB) merely to meet a security requirement of RRC signaling, security signaling on the air interface increases, and a terminal consumes more power. Therefore, how to ensure security of data transmission without increasing air interface signaling overheads excessively in a data transmission process of the UE is a problem to be urgently resolved currently.

SUMMARY

Embodiments of the present invention provide a security processing method and a related device, to resolve a technical problem that security and low power consumption cannot be balanced when data is transmitted between user equipment and a base station in the prior art.

According to a first aspect, an embodiment of the present invention provides a security processing method, where the method may include:

receiving, by a base station, security-processed target data sent by user equipment (UE);

sending, by the base station, security request information of the UE to a core network device; and receiving, by the base station, security response information returned by the core network device, where the security response information includes security parameter information of the UE and/or security-deprocessed target data.

In this embodiment of the present invention, a technical problem about how to securely transmit target data to the base station is mainly resolved. To be specific, after the base station receives the security-processed target data sent by the UE, the base station sends the security request information related to security deprocessing of the target data to the core network device, and then receives the related security parameter information returned by the core network device, or directly obtains the target data through deprocessing. Therefore, security protection is applied to the target data on an air interface, without increasing air interface signaling overheads.

With reference to the first aspect, in a first possible implementation of the first aspect, the method includes: when receiving the security-processed target data sent by the UE, receiving, by the base station, security related information sent by the UE; and when determining that the security related information is inconsistent with security related information locally stored by the base station, performing, by the base station, the step of sending security request information of the UE to a core network device.

With reference to the first possible implementation of the first aspect, in a second possible implementation of the first aspect, when the security response information includes the security parameter information of the UE, the receiving, by the base station, security response information returned by the core network device includes:

receiving, by the base station, updated access stratum (AS) security parameter information returned by the core network device, and initiating security negotiation to the UE based on the updated AS security parameter information.

With reference to the first aspect, in a third possible implementation of the first aspect, the receiving, by a base station, security-processed target data sent by user equipment UE includes:

receiving, by the base station, the security-processed target data sent by the UE by using uplink non-access stratum (NAS) signaling or uplink RRC signaling or uplink Media Access Control (MAC) layer signaling.

With reference to the first aspect, or the first possible implementation of the first aspect, or the second possible implementation of the first aspect, or the third possible implementation of the first aspect, in a fourth possible implementation of the first aspect, the security-processed target data includes non-access stratum (NAS) security-ciphered target data, or NAS integrity-protected target data, or NAS ciphered and NAS integrity-protected target data; or the security-processed target data includes access stratum (AS) security-ciphered target data, or AS integrity-protected target data, or AS ciphered and AS integrity-protected target data.

With reference to the first aspect, or the first possible implementation of the first aspect, or the second possible implementation of the first aspect, or the third possible implementation of the first aspect, or the fourth possible implementation of the first aspect, in a fifth possible implementation of the first aspect, the sending, by the base station, security request information of the UE to a core network device includes:

sending, by the base station, the security request information of the UE to the core network device by using an uplink S1 message.

With reference to the first aspect, or the first possible implementation of the first aspect, or the second possible implementation of the first aspect, or the third possible implementation of the first aspect, or the fourth possible implementation of the first aspect, or the fifth possible implementation of the first aspect, in a sixth possible implementation of the first aspect, the sending, by the base station, security request information of the UE to a core network device includes:

sending, by the base station, an identification of the UE and/or NAS security-processed target data to the core network device; or sending, by the base station, an identification of the UE and/or AS security-processed target data to the core network device.

With reference to the first aspect, or the first possible implementation of the first aspect, or the second possible implementation of the first aspect, or the third possible implementation of the first aspect, or the fourth possible implementation of the first aspect, or the fifth possible implementation of the first aspect, or the sixth possible implementation of the first aspect, in a seventh possible implementation of the first aspect, when the security response information includes the security parameter information of the UE, after the receiving, by the base station, security response information returned by the core network device, the method further includes:

performing, by the base station, security deprocessing on the security-processed target data based on the security parameter information in the security response information.

With reference to the first aspect, or the first possible implementation of the first aspect, or the second possible implementation of the first aspect, or the third possible implementation of the first aspect, or the fourth possible implementation of the first aspect, or the fifth possible implementation of the first aspect, or the sixth possible implementation of the first aspect, or the seventh possible implementation of the first aspect, in an eighth possible implementation of the first aspect, the receiving, by the base station, security response information returned by the core network device includes:

receiving, by the base station, the security response information returned by the core network device by using a downlink S1 message.

With reference to the first aspect, or the first possible implementation of the first aspect, or the second possible implementation of the first aspect, or the third possible implementation of the first aspect, or the fourth possible implementation of the first aspect, or the fifth possible implementation of the first aspect, or the sixth possible implementation of the first aspect, or the seventh possible implementation of the first aspect, or the eighth possible implementation of the first aspect, in a ninth possible implementation of the first aspect, the receiving, by the base station, security parameter information in security response information returned by the core network device includes:

receiving, by the base station, a NAS security parameter of the UE returned by the core network device, where the NAS security parameter includes a NAS ciphering key or a related parameter for generating a key and a NAS ciphering algorithm, and/or a NAS integrity protection key or a related parameter for generating a key and a NAS integrity protection algorithm; or receiving, by the base station, an AS security parameter of the UE returned by the core network device, where the AS security parameter includes an AS ciphering key or a related parameter for generating a key and an AS ciphering algorithm, and/or an AS integrity protection key or a related parameter for generating a key and an AS integrity protection algorithm.

With reference to the first aspect, or the first possible implementation of the first aspect, or the second possible implementation of the first aspect, or the third possible implementation of the first aspect, or the fourth possible implementation of the first aspect, or the fifth possible implementation of the first aspect, or the sixth possible implementation of the first aspect, or the seventh possible implementation of the first aspect, or the eighth possible implementation of the first aspect, or the ninth possible implementation of the first aspect, in a tenth possible implementation of the first aspect, the receiving, by the base station, security-deprocessed target data in security response information returned by the core network device includes:

receiving, by the base station, target data which is NAS security-deciphered, or NAS integrity-checked, or NAS security-deciphered and NAS integrity-checked based on the NAS security-processed target data, returned by the core network device; or receiving, by the base station, target data which is AS security-deciphered, or AS integrity-checked, or AS security-deciphered and AS integrity-checked based on the AS security-processed target data, returned by the core network device.

With reference to the first aspect, or the first possible implementation of the first aspect, or the second possible implementation of the first aspect, or the third possible implementation of the first aspect, or the fourth possible implementation of the first aspect, or the fifth possible implementation of the first aspect, or the sixth possible implementation of the first aspect, or the seventh possible implementation of the first aspect, or the eighth possible implementation of the first aspect, or the ninth possible implementation of the first aspect, or the tenth possible implementation of the first aspect, in an eleventh possible implementation of the first aspect, the performing, by the base station, security deprocessing on the security-processed target data based on the security parameter information in the security response information includes:

performing, by the base station, NAS deciphering, or NAS integrity check, or NAS deciphering and NAS integrity check on the NAS security-processed target data based on NAS security parameter information returned by the core network device; or performing, by the base station, AS deciphering, or AS integrity check, or AS deciphering and AS integrity check on the AS security-processed target data based on AS security parameter information returned by the core network device.

With reference to the first aspect, or the first possible implementation of the first aspect, or the second possible implementation of the first aspect, or the third possible implementation of the first aspect, or the fourth possible implementation of the first aspect, or the fifth possible implementation of the first aspect, or the sixth possible implementation of the first aspect, or the seventh possible implementation of the first aspect, or the eighth possible implementation of the first aspect, or the ninth possible implementation of the first aspect, or the tenth possible implementation of the first aspect, or the eleventh possible implementation of the first aspect, in a twelfth possible implementation of the first aspect, before the receiving, by a base station, security-processed target data sent by user equipment (UE), the method includes:

when a connection between the UE and the base station is released, sending, by the base station, the AS security parameter information to the core network device for storage; or sending, by the base station by using sent security request information or interface signaling between the base station and the core network device, the updated AS security parameter information to the core network device for storage.

With reference to the twelfth possible implementation of the first aspect, in a thirteenth possible implementation of the first aspect, after the receiving, by a base station, security-processed target data sent by user equipment (UE), the method further includes:

receiving a security parameter information change indication sent by the UE; or receiving a security parameter information change indication sent by the core network device.

With reference to the thirteenth possible implementation of the first aspect, in a fourteenth possible implementation of the first aspect, after the receiving, by the base station, a security parameter information change indication, the method includes: initiating, by the base station, a process of re-obtaining security parameter information of the UE.

With reference to the fourteenth possible implementation of the first aspect, in a fifteenth possible implementation of the first aspect, the initiating, by the base station, a process of re-obtaining security parameter information of the UE includes:

re-initiating security negotiation to the UE, and determining changed AS security parameter information; or obtaining, by the base station, updated NAS security parameter information from the core network device; or obtaining, by the base station, the updated AS security parameter information from the core network device, and initiating security negotiation to the UE based on the updated AS security parameter information.

According to a second aspect, an embodiment of the present invention provides a security processing method, where the method may include:

receiving, by a base station, security related information sent by user equipment (UE); and when the base station determines that the security related information is inconsistent with locally stored security related information of the UE, determining, by the base station, that security parameter information needs to be changed.

With reference to the second aspect, in a first possible implementation of the second aspect, after the determining, by the base station, that security parameter information needs to be changed, the method includes: initiating, by the base station, a process of re-obtaining security parameter information of the UE.

With reference to the first possible implementation of the second aspect, in a second possible implementation of the second aspect, the initiating, by the base station, a process of re-obtaining security parameter information of the UE includes:

re-initiating security negotiation to the UE, and determining changed access stratum (AS) security parameter information, so that the UE stores the changed AS security parameter information and/or that a core network device performs security processing by using the changed AS security parameter information; or obtaining, by the base station, updated non-access stratum (NAS) security parameter information from a core network device; or obtaining, by the base station, updated AS security parameter information from a core network device, and initiating security negotiation to the UE based on the updated AS security parameter information, so that the UE stores the updated AS security parameter information and/or that the core network device performs AS security processing by using the updated AS security parameter information.

According to a third aspect, an embodiment of the present invention provides a security processing method, where the method includes:

receiving, by a core network device, security request information of user equipment (UE) sent by a base station; and sending, by the core network device, security response information to the base station, where the security response information includes security parameter information of the UE and/or security-deprocessed target data.

With reference to the third aspect, in a first possible implementation of the third aspect, the receiving, by a core network device, security request information of user equipment (UE) sent by a base station includes:

receiving, by the core network device, an identification of the UE and/or the non-access stratum (NAS) security-processed target data, sent by the base station; or receiving, by the core network device, an identification of the UE and/or the access stratum (AS) security-processed target data, sent by the base station.

With reference to the third aspect, or the first possible implementation of the third aspect, in a second possible implementation of the third aspect, the sending, by the core network device, security parameter information in security response information to the base station includes:

sending, by the core network device, a NAS security parameter of the UE to the base station, where the NAS security parameter includes a NAS ciphering key or a related parameter for generating a key and a NAS ciphering algorithm, and/or a NAS integrity protection key or a related parameter for generating a key and a NAS integrity protection algorithm; or sending, by the core network device, an AS security parameter of the UE to the base station, where the AS security parameter includes an AS ciphering key or a related parameter for generating a key and an AS ciphering algorithm, and/or an AS integrity protection key or a related parameter for generating a key and an AS integrity protection algorithm.

With reference to the third aspect, or the first possible implementation of the third aspect, or the second possible implementation of the third aspect, in a third possible implementation of the third aspect, the sending, by the core network device, security-deprocessed target data in security response information to the base station includes:

sending, by the core network device to the base station, target data obtained after the security-processed target data is NAS security-deciphered by using NAS security parameter information, or NAS integrity-checked target data, or NAS security-deciphered and NAS integrity-checked target data; or sending, by the core network device to the base station, target data obtained after the security-processed target data is AS security-deciphered by using AS security parameter information, or AS integrity-checked target data, or AS security-deciphered and AS integrity-checked target data.

With reference to the third aspect, or the first possible implementation of the third aspect, or the second possible implementation of the third aspect, or the third possible implementation of the third aspect, in a fourth possible implementation of the third aspect, after the sending, by the core network device, security response information to the base station, the method further includes:

sending, by the core network device, a NAS security parameter information change indication to the base station, where the change indication is changed NAS security parameter information determined after security negotiation is performed again between the UE and the core network device.

With reference to the third aspect, or the first possible implementation of the third aspect, or the second possible implementation of the third aspect, or the third possible implementation of the third aspect, in a fifth possible implementation of the third aspect, before the sending, by the core network device, security response information to the base station, the method includes:

receiving the AS security parameter information of the UE sent by the base station, where the AS security parameter information is AS security parameter information determined after the base station initiates security negotiation to the UE after a connection is established between the UE and the base station; or receiving and storing the AS security parameter information or changed AS security parameter information that is stored by the UE and sent by the base station by using the security request information or interface signaling from the base station to the core network device.

With reference to the third aspect, or the first possible implementation of the third aspect, or the second possible implementation of the third aspect, or the third possible implementation of the third aspect, or the fifth possible implementation of the third aspect, in a sixth possible implementation of the third aspect, the method further includes:

when the core network device detects that the AS security parameter information changes, sending a security parameter information change indication to the base station.

According to a fourth aspect, an embodiment of the present invention provides a security processing method, where the method includes:

sending, by UE, non-access stratum (NAS) security-processed target data to a base station, where the NAS security-processed target data includes NAS security-ciphered target data, or NAS integrity-protected target data, or NAS ciphered and NAS integrity-protected target data; or sending, by UE, access stratum (AS) security-processed target data to a base station, where the AS security-processed target data includes AS security-ciphered target data, or AS integrity-protected target data, or AS ciphered and AS integrity-protected target data.

With reference to the fourth aspect, in a first possible implementation of the fourth aspect, the sending, by UE, NAS security-processed target data to a base station includes:

sending, by the UE by using uplink NAS signaling or uplink RRC signaling or uplink MAC layer signaling, the NAS security-processed target data to the base station.

With reference to the fourth aspect, in a second possible implementation of the fourth aspect, the sending, by UE, AS security-processed target data to a base station includes:

sending, by the UE by using uplink RRC signaling or uplink MAC layer signaling, the AS security-processed target data to the base station.

With reference to the fourth aspect, or the first possible implementation of the fourth aspect, in a third possible implementation of the fourth aspect, before the sending, by UE, NAS security-processed target data to a base station, the method includes:

performing, by the UE, NAS security processing on the target data by using NAS security parameter information, where the NAS security parameter information is NAS security parameter information determined through security negotiation between the UE and a core network device, and the NAS security parameter information includes a NAS ciphering key or a related parameter for generating a key and a NAS ciphering algorithm, and/or a NAS integrity protection key or a related parameter for generating a key and a NAS integrity protection algorithm.

With reference to the fourth aspect, or the second possible implementation of the fourth aspect, in a fourth possible implementation of the fourth aspect, before the sending, by UE, access stratum (AS) security-processed target data to a base station, the method includes:

performing, by the UE, AS security processing on the target data by using AS security parameter information, where the AS security parameter information is AS security parameter information determined through security negotiation between the UE and the base station or AS security parameter information stored in the UE, and the AS security parameter information includes an AS ciphering key or a related parameter for generating a key and an AS ciphering algorithm, and/or an AS integrity protection key or a related parameter for generating a key and an AS integrity protection algorithm.

With reference to the fourth aspect, or the first possible implementation of the fourth aspect, or the third possible implementation of the fourth aspect, in a fifth possible implementation of the fourth aspect, the method further includes:

sending, by the UE, a NAS security parameter information change indication to the base station, where the change indication is changed NAS security parameter information determined after security negotiation is performed again between the UE and the core network device.

With reference to the fourth aspect, or the second possible implementation of the fourth aspect, or the fourth possible implementation of the fourth aspect, in a sixth possible implementation of the fourth aspect, the method further includes:

sending, by the UE, an AS security parameter information change indication to the base station, where the change indication is changed AS security parameter information determined after security negotiation is performed again between the UE and the core network device.

According to a fifth aspect, an embodiment of the present invention provides a base station, where the base station may include an input unit, an output unit, a storage unit, and a processing unit, where the storage unit is configured to store program code, and the processing unit is configured to invoke the program code stored in the storage unit to perform the following steps:

receiving, by the input unit, security-processed target data sent by user equipment (UE);

sending security request information of the UE to a core network device through the output unit; and receiving, through the input unit, security response information returned by the core network device, where the security response information includes security parameter information of the UE and/or security-deprocessed target data.

With reference to the fifth aspect, in a first possible implementation of the fifth aspect, the processing unit is configured to: when receiving, through the input unit, the security-processed target data sent by the UE, receive, through the input unit, security related information sent by the UE; and when the base station determines that the security related information is inconsistent with security related information locally stored by the base station, perform the step of sending security request information of the UE to a core network device through the output unit.

With reference to the first possible implementation of the fifth aspect, in a second possible implementation of the fifth aspect, when the security response information includes the security parameter information of the UE, that the processing unit is configured to receive, through the input unit, security response information returned by the core network device is specifically:

receiving, through the input unit, updated access stratum (AS) security parameter information returned by the core network device, and initiating security negotiation to the UE based on the updated AS security parameter information.

With reference to the fifth aspect, in a third possible implementation of the fifth aspect, the receiving, by the processing unit through the input unit, security-processed target data sent by user equipment (UE) includes:

receiving, through the input unit, the security-processed target data sent by the UE by using uplink NAS signaling or uplink RRC signaling or uplink MAC layer signaling.

With reference to the fifth aspect, or the first possible implementation of the fifth aspect, or the second possible implementation of the fifth aspect, or the third possible implementation of the fifth aspect, in a fourth possible implementation of the fifth aspect, the security-processed target data includes non-access stratum (NAS) security-ciphered target data, or NAS integrity-protected target data, or NAS ciphered and NAS integrity-protected target data; or the security-processed target data includes access stratum (AS) security-ciphered target data, or AS integrity-protected target data, or AS ciphered and AS integrity-protected target data.

With reference to the fifth aspect, or the first possible implementation of the fifth aspect, or the second possible implementation of the fifth aspect, or the third possible implementation of the fifth aspect, or the fourth possible implementation of the fifth aspect, in a fifth possible implementation of the fifth aspect, the sending, by the processing unit, security request information of the UE to a core network device through the output unit includes:

sending, by using an uplink S1 message, the security request information of the UE to the core network device through the output unit.

With reference to the fifth aspect, or the first possible implementation of the fifth aspect, or the second possible implementation of the fifth aspect, or the third possible implementation of the fifth aspect, or the fourth possible implementation of the fifth aspect, or the fifth possible implementation of the fifth aspect, in a sixth possible implementation of the fifth aspect, the sending, by the processing unit, security request information of the UE to a core network device through the output unit includes:

sending an identification of the UE and/or NAS security-processed target data to the core network device through the output unit; or sending an identification of the UE and/or AS security-processed target data to the core network device through the output unit.

With reference to the fifth aspect, or the first possible implementation of the fifth aspect, or the second possible implementation of the fifth aspect, or the third possible implementation of the fifth aspect, or the fourth possible implementation of the fifth aspect, or the fifth possible implementation of the fifth aspect, or the sixth possible implementation of the fifth aspect, in a seventh possible implementation of the fifth aspect, when the security response information includes the security parameter information of the UE, the processing unit is further configured to:

after receiving, through the input unit, the security response information returned by the core network device, perform security deprocessing on the security-processed target data based on the security parameter information in the security response information.

With reference to the fifth aspect, or the first possible implementation of the fifth aspect, or the second possible implementation of the fifth aspect, or the third possible implementation of the fifth aspect, or the fourth possible implementation of the fifth aspect, or the fifth possible implementation of the fifth aspect, or the sixth possible implementation of the fifth aspect, or the seventh possible implementation of the fifth aspect, in an eighth possible implementation of the fifth aspect, the receiving, by the processing unit through the input unit, security response information returned by the core network device includes:

receiving, by using the input unit, the security response information returned by the core network device by using a downlink S1 message.

With reference to the fifth aspect, or the first possible implementation of the fifth aspect, or the second possible implementation of the fifth aspect, or the third possible implementation of the fifth aspect, or the fourth possible implementation of the fifth aspect, or the fifth possible implementation of the fifth aspect, or the sixth possible implementation of the fifth aspect, or the seventh possible implementation of the fifth aspect, or the eighth possible implementation of the fifth aspect, in a ninth possible implementation of the fifth aspect, the receiving, by the processing unit through the input unit, security parameter information in security response information returned by the core network device includes:

receiving, through the input unit, a NAS security parameter of the UE returned by the core network device, where the NAS security parameter includes a NAS ciphering key or a related parameter for generating a key and a NAS ciphering algorithm, and/or a NAS integrity protection key or a related parameter for generating a key and a NAS integrity protection algorithm; or receiving, through the input unit, an AS security parameter of the UE returned by the core network device, where the AS security parameter includes an AS ciphering key or a related parameter for generating a key and an AS ciphering algorithm, and/or an AS integrity protection key or a related parameter for generating a key and an AS integrity protection algorithm.

With reference to the fifth aspect, or the first possible implementation of the fifth aspect, or the second possible implementation of the fifth aspect, or the third possible implementation of the fifth aspect, or the fourth possible implementation of the fifth aspect, or the fifth possible implementation of the fifth aspect, or the sixth possible implementation of the fifth aspect, or the seventh possible implementation of the fifth aspect, or the eighth possible implementation of the fifth aspect, or the ninth possible implementation of the fifth aspect, in a tenth possible implementation of the fifth aspect, the receiving, by the processing unit through the input unit, security-deprocessed target data in security response information returned by the core network device includes:

receiving, through the input unit, target data which is NAS security-deciphered, or NAS integrity-checked, or NAS security-deciphered and NAS integrity-checked based on the NAS security-processed target data, returned by the core network device; or receiving, through the input unit, target data which is AS security-deciphered, or AS integrity-checked, or AS security-deciphered and AS integrity-checked based on the AS security-processed target data, returned by the core network device.

With reference to the fifth aspect, or the first possible implementation of the fifth aspect, or the second possible implementation of the fifth aspect, or the third possible implementation of the fifth aspect, or the fourth possible implementation of the fifth aspect, or the fifth possible implementation of the fifth aspect, or the sixth possible implementation of the fifth aspect, or the seventh possible implementation of the fifth aspect, or the eighth possible implementation of the fifth aspect, or the ninth possible implementation of the fifth aspect, or the tenth possible implementation of the fifth aspect, in an eleventh possible implementation of the fifth aspect, the performing, by the processing unit, security deprocessing on the security-processed target data based on the security parameter information in the security response information includes:

performing NAS deciphering, or NAS integrity check, or NAS deciphering and NAS integrity check on the NAS security-processed target data based on NAS security parameter information returned by the core network device; or performing AS deciphering, or AS integrity check, or AS deciphering and AS integrity check on the AS security-processed target data based on AS security parameter information returned by the core network device.

With reference to the fifth aspect, or the first possible implementation of the fifth aspect, or the second possible implementation of the fifth aspect, or the third possible implementation of the fifth aspect, or the fourth possible implementation of the fifth aspect, or the fifth possible implementation of the fifth aspect, or the sixth possible implementation of the fifth aspect, or the seventh possible implementation of the fifth aspect, or the eighth possible implementation of the fifth aspect, or the ninth possible implementation of the fifth aspect, or the tenth possible implementation of the fifth aspect, or the eleventh possible implementation of the fifth aspect, in a twelfth possible implementation of the fifth aspect, the processing unit is further configured to: before receiving, through the input unit, the security-processed target data sent by the user equipment (UE), when a connection between the UE and the base station is released, send, through the output unit, the AS security parameter information to the core network device for storage; or send, by using security request information sent by the output unit or interface signaling between the base station and the core network device, the updated AS security parameter information to the core network device for storage.

With reference to the twelfth possible implementation of the fifth aspect, in a thirteenth possible implementation of the fifth aspect, the processing unit is further configured to: after receiving, through the input unit, the security-processed target data sent by the user equipment (UE), receive, through the input unit, a security parameter information change indication sent by the UE; or receive, through the input unit, a security parameter information change indication sent by the core network device.

With reference to the thirteenth possible implementation of the fifth aspect, in a fourteenth possible implementation of the fifth aspect, the processing unit is further configured to: after receiving the security parameter information change indication through the input unit, initiate, through the output unit, a process of re-obtaining security parameter information of the UE.

With reference to the fourteenth possible implementation of the fifth aspect, in a fifteenth possible implementation of the fifth aspect, that the processing unit is configured to initiate, through the output unit, a process of re-obtaining security parameter information of the UE is specifically:

re-initiating security negotiation to the UE through the output unit, and determining changed AS security parameter information; or obtaining updated NAS security parameter information from the core network device through the input unit; or obtaining the updated AS security parameter information from the core network device through the input unit, and initiating security negotiation to the UE based on the updated AS security parameter information.

According to a sixth aspect, an embodiment of the present invention provides a base station, where the base station includes an input unit, an output unit, a storage unit, and a processing unit, where the storage unit is configured to store program code, and the processing unit is configured to invoke the program code stored in the storage unit to perform the following steps:

receiving, through the input unit, security related information sent by user equipment (UE); and when the base station determines that the security related information is inconsistent with locally stored security related information of the UE, determining that security parameter information needs to be changed.

With reference to the sixth aspect, in a first possible implementation of the sixth aspect, the processing unit is further configured to: after determining that the security parameter information needs to be changed, initiate, through the output unit, a process of re-obtaining security parameter information of the UE.

With reference to the first possible implementation of the sixth aspect, in a second possible implementation of the sixth aspect, that the processing unit is configured to initiate, through the output unit, a process of re-obtaining security parameter information of the UE is specifically:

re-initiating security negotiation to the UE through the output unit, and determining changed access stratum (AS) security parameter information, so that the UE stores the changed AS security parameter information and/or that a core network device performs security processing by using the changed AS security parameter information; or obtaining updated non-access stratum (NAS) security parameter information from a core network device through the input unit; or obtaining updated AS security parameter information from a core network device through the input unit, and initiating security negotiation to the UE based on the updated AS security parameter information, so that the UE stores the updated AS security parameter information and/or that the core network device performs AS security processing by using the updated AS security parameter information.

According to a seventh aspect, an embodiment of the present invention provides a core network device, where the core network device includes an input unit, an output unit, a storage unit, and a processing unit, where the storage unit is configured to store program code, and the processing unit is configured to invoke the program code stored in the storage unit to perform the following steps:

receiving, through the input unit, security request information of user equipment UE sent by a base station; and sending security response information to the base station through the output unit, where the security response information includes security parameter information of the UE and/or security-deprocessed target data.

With reference to the seventh aspect, in a first possible implementation of the seventh aspect, that the processing unit is configured to receive, through the input unit, security request information of user equipment (UE) sent by a base station includes:

receiving, through the input unit, an identification of the UE and/or the non-access stratum (NAS) security-processed target data, sent by the base station; or receiving, through the input unit, an identification of the UE and/or the access stratum (AS) security-processed target data, sent by the base station.

With reference to the seventh aspect, or the first possible implementation of the seventh aspect, in a second possible implementation of the seventh aspect, that the processing unit is configured to send security parameter information in security response information to the base station through the output unit includes:

sending a NAS security parameter of the UE to the base station through the output unit, where the NAS security parameter includes a NAS ciphering key or a related parameter for generating a key and a NAS ciphering algorithm, and/or a NAS integrity protection key or a related parameter for generating a key and a NAS integrity protection algorithm; or sending an AS security parameter of the UE to the base station through the output unit, where the AS security parameter includes an AS ciphering key or a related parameter for generating a key and an AS ciphering algorithm, and/or an AS integrity protection key or a related parameter for generating a key and an AS integrity protection algorithm.

With reference to the seventh aspect, or the first possible implementation of the seventh aspect, or the second possible implementation of the seventh aspect, in a third possible implementation of the seventh aspect, that the processing unit is configured to send security-deprocessed target data in security response information to the base station through the output unit includes:

sending, to the base station through the output unit, target data obtained after the security-processed target data is NAS security-deciphered by using NAS security parameter information, or NAS integrity-checked target data, or NAS security-deciphered and NAS integrity-checked target data; or sending, to the base station through the output unit, target data obtained after the security-processed target data is AS security-deciphered by using AS security parameter information, or AS integrity-checked target data, or AS security-deciphered and AS integrity-checked target data.

With reference to the seventh aspect, or the first possible implementation of the seventh aspect, or the second possible implementation of the seventh aspect, or the third possible implementation of the seventh aspect, in a fourth possible implementation of the seventh aspect, the processing unit is further configured to:

after sending the security response information to the base station through the output unit, further send a NAS security parameter information change indication to the base station through the output unit, where the change indication is changed NAS security parameter information determined after security negotiation is performed again between the UE and the core network device.

With reference to the seventh aspect, or the first possible implementation of the seventh aspect, or the second possible implementation of the seventh aspect, or the third possible implementation of the seventh aspect, in a fifth possible implementation of the seventh aspect, the processing unit is further configured to:

receive, through the input unit, the AS security parameter information of the UE sent by the base station, where the AS security parameter information is AS security parameter information determined after the base station initiates security negotiation to the UE after a connection is established between the UE and the base station; or receive, through the input unit, the AS security parameter information or changed AS security parameter information that is stored by the UE and sent by the base station by using the security request information or interface signaling from the base station to the core network device, and store the AS security parameter information or the changed AS security parameter information.

With reference to the seventh aspect, or the first possible implementation of the seventh aspect, or the second possible implementation of the seventh aspect, or the third possible implementation of the seventh aspect, or the fifth possible implementation of the seventh aspect, in a sixth possible implementation of the seventh aspect, the processing unit is further configured to:

when the core network device detects that the AS security parameter information changes, send a security parameter information change indication to the base station through the output unit.

According to an eighth aspect, an embodiment of the present invention provides user equipment (UE), where the UE includes an input unit, an output unit, a storage unit, and a processing unit, where the storage unit is configured to store program code, and the processing unit is configured to invoke the program code stored in the storage unit to perform the following steps:

sending non-access stratum (NAS) security-processed target data to a base station through the output unit, where the NAS security-processed target data includes NAS security-ciphered target data, or NAS integrity-protected target data, or NAS ciphered and NAS integrity-protected target data; or sending access stratum (AS) security-processed target data to a base station through the output unit, where the AS security-processed target data includes AS security-ciphered target data, or AS integrity-protected target data, or AS ciphered and AS integrity-protected target data.

With reference to the eighth aspect, in a first possible implementation of the eighth aspect, that the processing unit is configured to send NAS security-processed target data to a base station through the output unit is specifically:

sending, by using uplink NAS signaling or uplink RRC signaling or uplink MAC layer signaling, the NAS security-processed target data to the base station through the output unit.

With reference to the eighth aspect, in a second possible implementation of the eighth aspect, that the processing unit is configured to send AS security-processed target data to a base station through the output unit includes:

sending, by the UE by using uplink RRC signaling or uplink MAC layer signaling, the AS security-processed target data to the base station.

With reference to the eighth aspect, or the first possible implementation of the eighth aspect, in a third possible implementation of the eighth aspect, the processing unit is further configured to:

before sending the NAS security-processed target data to the base station through the output unit, perform NAS security processing on the target data by using NAS security parameter information, where the NAS security parameter information is NAS security parameter information determined through security negotiation between the UE and a core network device, and the NAS security parameter information includes a NAS ciphering key or a related parameter for generating a key and a NAS ciphering algorithm, and/or a NAS integrity protection key or a related parameter for generating a key and a NAS integrity protection algorithm.

With reference to the eighth aspect, or the second possible implementation of the eighth aspect, in a fourth possible implementation of the eighth aspect, the processing unit is further configured to:

before sending the access stratum (AS) security-processed target data to the base station through the output unit, perform AS security processing on the target data by using AS security parameter information, where the AS security parameter information is AS security parameter information determined through security negotiation between the UE and the base station or AS security parameter information stored in the UE, and the AS security parameter information includes an AS ciphering key or a related parameter for generating a key and an AS ciphering algorithm, and/or an AS integrity protection key or a related parameter for generating a key and an AS integrity protection algorithm.

With reference to the eighth aspect, or the first possible implementation of the eighth aspect, or the third possible implementation of the eighth aspect, in a fifth possible implementation of the eighth aspect, the processing unit is further configured to:

send a NAS security parameter information change indication to the base station through the output unit, where the change indication is changed NAS security parameter information determined after security negotiation is performed again between the UE and the core network device.

With reference to the eighth aspect, or the second possible implementation of the eighth aspect, or the fourth possible implementation of the eighth aspect, in a sixth possible implementation of the eighth aspect, the processing unit is further configured to:

send an AS security parameter information change indication to the base station through the output unit, where the change indication is changed AS security parameter information determined after security negotiation is performed again between the UE and the core network device.

In the embodiments of the present invention, a technical problem about how to securely transmit target data to the base station while reducing air interface signaling overheads or power consumption is mainly resolved. In the present invention, during NAS transmission, that is, after the base station receives the NAS security-processed target data sent by the UE, the base station sends the security request information related to security deprocessing of the target data to the core network device, and then receives the related security parameter information returned by the core network device, or directly obtains the target data through parsing. Therefore, security protection is applied to the target data on the air interface. During AS transmission, that is, during initial access, after a connection is established between the UE and the base station, AS security protection in the prior art is applied. When the connection is released, the base station sends the AS security related security parameter information used at this time to the core network device for storage. When a connection is reestablished and the UE has target data to send, the base station initiates the security request information previously stored and related to security deprocessing of the target data to the core network device, and then receives the related security parameter information returned by the core network device, or directly obtains the target data through parsing. Therefore, a procedure for negotiating the security parameter information by the base station and the UE by using an AS SMC can be avoided, not only AS security protection is implemented, but also power consumption is reduced.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, the technical solutions in the embodiments of the present invention may be applied to various communications systems, such as a global system for mobile communications (GSM), a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, LTE time division duplex (TDD) system, and a Universal Mobile Telecommunications System (UMTS).

It should also be understood that, in the embodiments of the present invention, a base station may be a base transceiver station (BTS) in GSM or CDMA, or may be a NodeB (NodeB) in WCDMA, or may be an evolved NodeB (eNB or eNodeB) in LTE, a base station device in a future 5G network, or the like. This is not limited in the present invention.

It should also be understood that, in the embodiments of the present invention, UE may communicate with one or more core networks through a radio access network (RAN). The UE may be an access terminal, a terminal device, a subscriber unit, a subscriber station, a mobile station, a mobile, a remote station, a remote terminal, a mobile device, a user terminal, a terminal, a wireless communications device, a user agent, a user apparatus, or the like supporting a communication type such as machine-to-machine M2M communication, enhanced machine type communication EMTC, or narrow band Internet of Things NB IoT. Specifically, the UE may be a cellular phone, a cordless phone, a smartphone, a smart metering terminal, a Session Initiation Protocol (SIP) phone, a wireless local loop (WLL) station, a smart band, a smart wearable device, an MP3 (Moving Picture Experts Group Audio Layer-3) player, an MP4 (Moving Picture Experts Group Audio Layer-4) player, a personal digital assistant (PDA), a handheld device having a wireless communication function, a computing device, or another processing device connected to a wireless modem, an in-vehicle device, a terminal device in a future 5G network, or the like.

Figure 1:
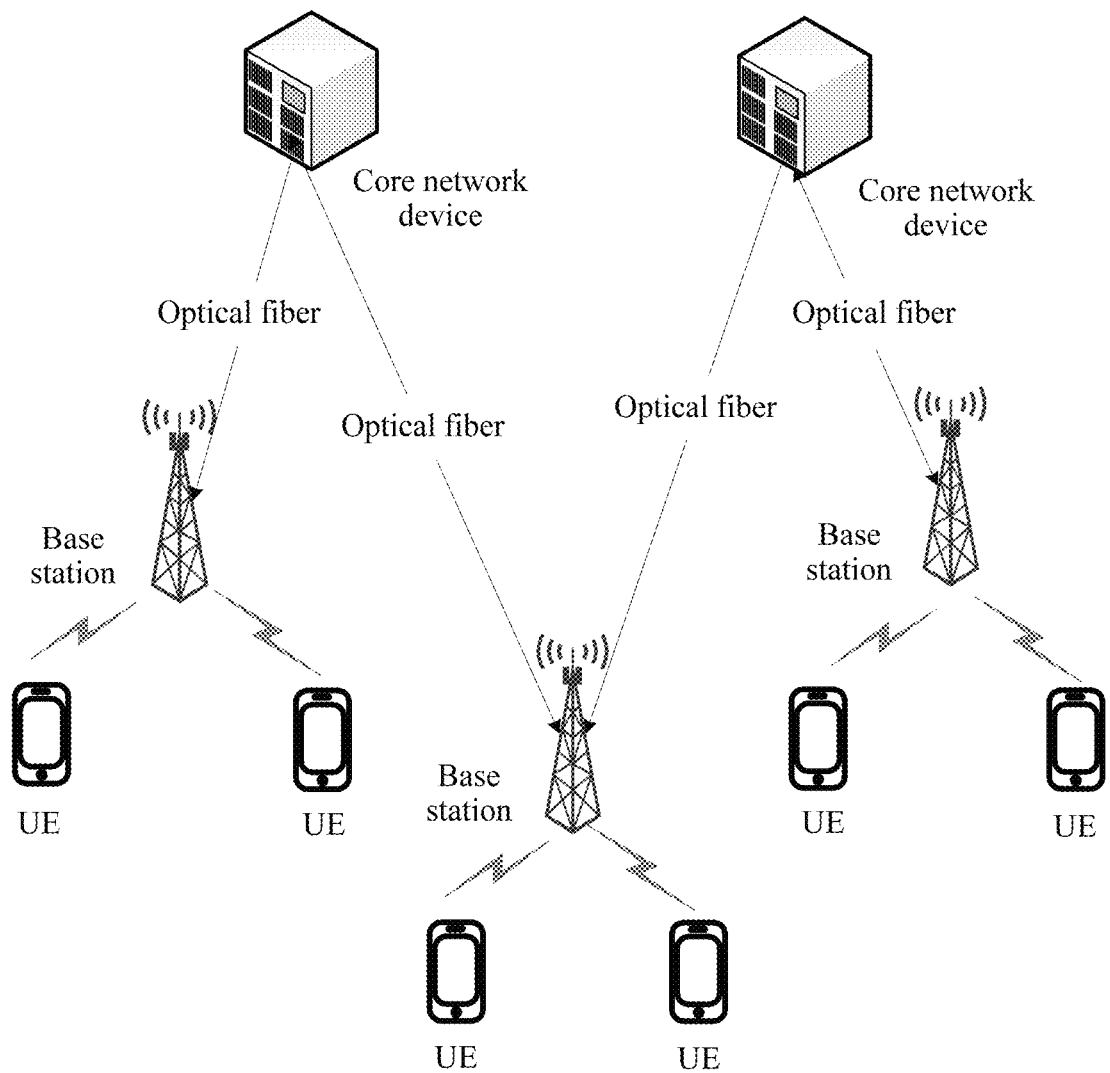
FIG. 1 is a schematic diagram of a network architecture in a security processing method according to the present invention.

For ease of understanding the embodiments of the present invention, the following first describes a network architecture in a security processing method. The embodiments of the present invention are based on this network architecture. Referring to FIG. 1, the network architecture includes UE, a base station, and a core network device. The UE and the base station transmit data to each other through an air interface, that is, wireless communication. Each base station is wired connected to the core network device by using an optical fiber, for connecting, managing, and bearing data or services, or the like. It may be understood that, the foregoing network architecture in FIG. 1 is merely a preferred implementation in the embodiments of the present invention, and the network architecture in the embodiments of the present invention includes but is not limited to the foregoing network architecture.

In the embodiments of the present invention, the core network device is mainly described by using a mobility management entity (MME) as an example. The MME is a network element responsible for signaling processing in the core network, and can implement functions such as NAS signaling parsing and processing, NAS signaling security, interaction with a core network of another network, and mobility control, roaming processing, authentication management, and bearer management of the UE. The core network device in the present invention includes but is not limited to the MME. Any entity that can implement corresponding functions of the core network device in the embodiments of the present invention shall fall within the protection scope of the present invention.

Figure 2:
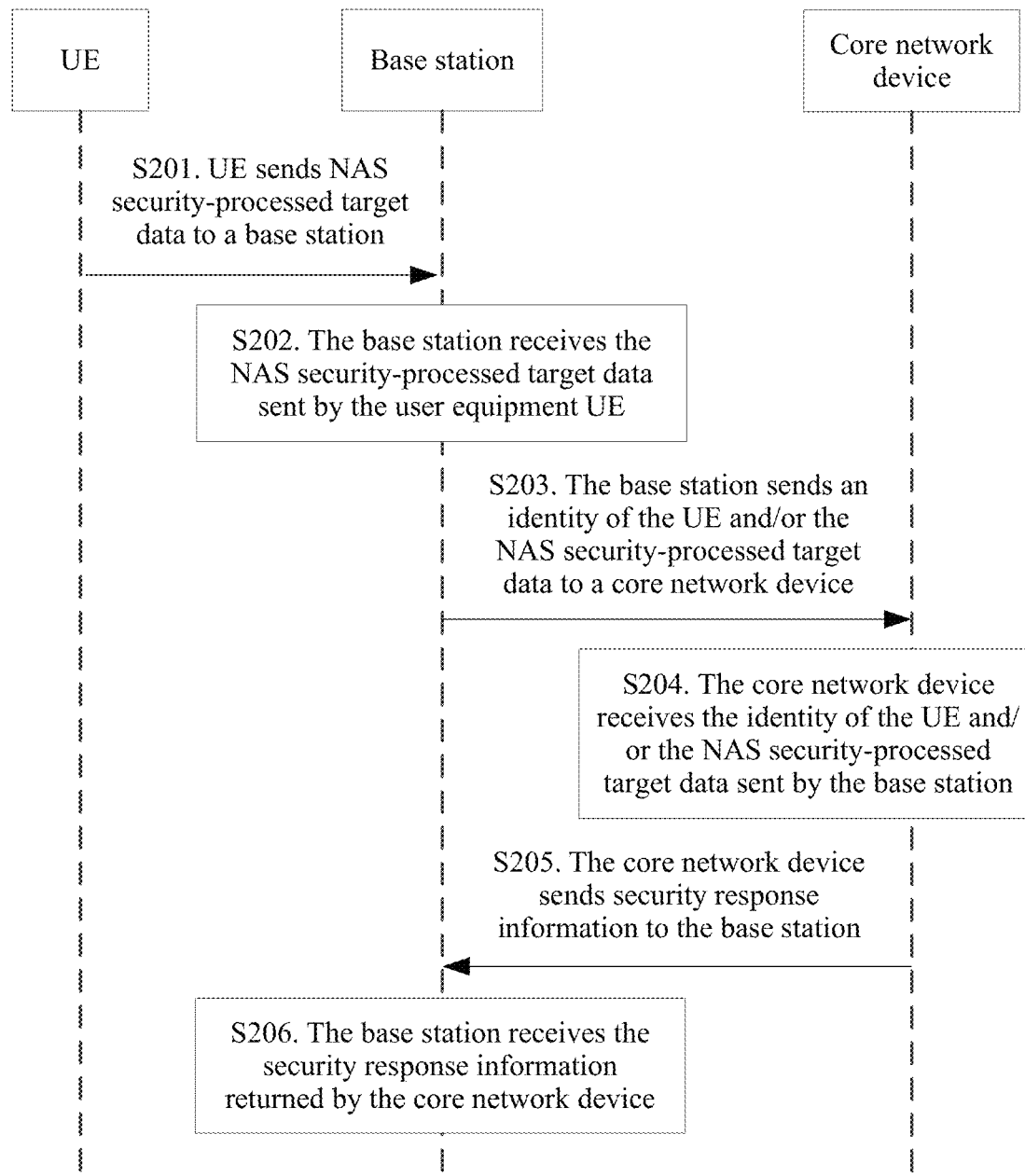
FIG. 2 is a schematic flowchart of a security processing method according to the present invention.

Referring to FIG. 2, FIG. 2 is a schematic flowchart of a security processing method in an embodiment of the present invention. With reference to FIG. 2, the following describes in detail interaction between UE, a base station, and a core network device, and NAS transmission performed between the UE and the base station. As shown in FIG. 2, the method may include the following step S201 to step S206.

Step S201: UE sends NAS security-processed target data to a base station.

Specifically, the UE sends the non-access stratum security-processed target data to the base station by using uplink NAS signaling or uplink RRC signaling or uplink MAC layer signaling. The security-processed target data may be non-access stratum NAS security-ciphered target data, or NAS integrity-protected target data, or NAS ciphered and NAS integrity-protected target data.

In a possible implementation, before the UE sends the non-access stratum NAS security-processed target data to the base station, the UE performs security negotiation using a NAS Security Mode Command (SMC) with the core network device (for example, an MME), and then the UE performs NAS security processing on the target data. After performing NAS security negotiation, the UE and the MME generate NAS security parameter information. Further, the NAS security parameter information includes a NAS ciphering key or a related parameter for generating a key and a NAS ciphering algorithm, and/or a NAS integrity protection key or a related parameter for generating a key and a NAS integrity protection algorithm. For example, in a NAS signaling key, KNASenc is a key used for NAS signaling ciphering, and is obtained through calculation by the UE and the MME respectively according to a ciphering algorithm negotiated by the two parties, and KNASint is a key used for NAS signaling integrity protection.

In a possible implementation, the UE further sends a NAS security parameter information change indication to the base station, where the change indication may be changed NAS security parameter information determined when the UE and/or the core network device (for example, the MME) detect/detects that the NAS security parameter information currently used by the UE changes, that is, the UE and the MME need to perform key negotiation again. The NAS security parameter information is carried in the change indication and sent to the base station, to ensure that all security parameter information subsequently used for transmitting data between the UE and the base station is updated and valid, so that additional air interface signaling overheads caused by invalid security parameter information are reduced.

In a possible implementation, when receiving the security-processed target data sent by the UE, the base station may further receive security related information sent by the UE; and when determining that the security related information is inconsistent with security related information locally stored by the base station, the base station performs a step of sending security request information of the UE to the core network device, to obtain updated security parameter information from the core network device.

When the security response information includes the security parameter information of the UE, that the base station receives the security response information returned by the core network device includes: the base station receives updated non-access stratum NAS security parameter information returned by the core network device; or the base station receives updated access stratum AS security parameter information returned by the core network device, and initiates security negotiation to the UE based on the updated AS security parameter information.

In a specific communication application scenario, for example, in response to a random access request sent by the UE to the base station (e.g. eNB), the base station sends a random access response to the UE; then the UE sends an RRC connection request to the base station; and after receiving the RRC connection request, the base station sends an RRC connection setup message to the UE. After receiving the RRC connection setup message sent by the base station, the UE sends an RRC connection setup complete message to the base station, and performs, by using NAS security parameter information, security processing on target data (such as a measurement report or location information) that needs to be reported to the base station. For example, the measurement report is carried in a NAS PDU and ciphered, or is carried in RRC signaling and ciphered. A specific manner of ciphering the target data is not limited in the present invention. The present invention does not limit the specific manner of ciphering the target data.

Step S202: The base station receives the NAS security-processed target data sent by the user equipment UE.

Specifically, the base station receives the security-processed target data sent by the UE by using the uplink NAS signaling or the uplink RRC signaling or the uplink MAC layer signaling in step S201.

Step S203: The base station sends an identification of the UE and/or NAS security-processed target data to a core network device.

Specifically, the base station may send the identification of the UE and/or the NAS security-processed target data to the core network device by using an initial UE message or other uplink signaling, for example, a UL NAS transport message, or uplink S1-AP signaling such as UE measurement report transport, or other uplink signaling. The base station (e.g. eNB) cannot obtain a measurement report through parsing after receiving the target data such as the measurement report, because the NAS security-processed target data cannot be parsed by the base station. The reason is that security parameter information used for NAS security deprocessing of the target data is determined through negotiation between the UE and the core network device MME. Therefore, in this case, if the base station wants to obtain NAS security-deprocessed target data, the base station needs to send security request information to the core network device MME. It may be understood that, content of the security request information may be an identification for identifying the UE, and the identification may allow the MME to correspondingly find security parameter information matching the identification. However, it may also be understood that, the NAS security-processed target data that needs to be read may also be directly sent to the MME, so that the MME performs security deprocessing and then returns the security-deprocessed target data to the base station or returns both the security parameter information and the security-deprocessed target data to the base station, so long as the base station can finally read the NAS security-processed target data smoothly.

Step S204: The core network device receives the identification of the UE and/or the NAS security-processed target data sent by the base station.

Specifically, the core network device MME may receive, through an S1 interface, the identification of the UE and/or the NAS security-processed target data sent by the base station in step S203.

In a possible implementation, before the core network device MME receives the security request information of the user equipment UE that is sent by the base station, the MME initiates a security mode command to the UE and determines NAS security parameter information. In addition, because the MME always stores, after the negotiating and determining, the security parameter information determined (including a case in which the security parameter information changes) by the UE, the MME performs NAS security deprocessing on the target data by using the related NAS security parameter information, and obtains the security-deprocessed data.

Step S205: The core network device sends security response information to the base station, where the security response information includes security parameter information of the UE and/or security-deprocessed target data.

Specifically, the core network device MME may send the security response information to the base station. For example, the security response information may also be carried in a piece of S1-AP downlink signaling, for example, carried in downlink NAS transport, or initial context setup request. The security response information correspondingly includes the security parameter information of the UE and/or the security-deprocessed target data. Identification information of the UE may be identification information such as S-TMSI, eNB UE S1AP ID, MME UE S1AP IP, or IMSI.

For example, when the security request information includes only the identification of the UE, the security response information returned by the MME may include only the security parameter information matching the identification of the UE; when the security request information includes the NAS security-processed target data, the security response information returned by the MME includes the target data obtained after security deprocessing is performed on the NAS security-processed target data by using the security parameter information, and may also include the security parameter information matching the identification of the UE; or when the security request information includes not only the identification of the UE but also the NAS security-processed target data, the security response information returned by the MME may definitely include the target data obtained after security deprocessing is performed on the NAS security-processed target data by using the security parameter information, and may also include the security parameter information matching the identification of the UE. When the security request information includes only the identification of the UE, the security response information returned by the MME includes the security parameter information matching the UE.

In a possible implementation, when the core network device sends the security parameter information of the UE to the base station, the security parameter information may include a NAS security parameter, where the NAS security parameter includes a NAS ciphering key or a related parameter for generating a key and a NAS ciphering algorithm, and/or a NAS integrity protection key or a related parameter for generating a key and a NAS integrity protection algorithm.

In a possible implementation, the core network device sends the security-deprocessed target data of the UE to the base station, where the security-deprocessed target data is the target data obtained after security deprocessing, and may specifically include target data obtained after the security-processed target data is NAS security-deciphered by using the NAS security parameter information, or NAS integrity-checked target data, or NAS security-deciphered and NAS integrity-checked target data.

In a possible implementation, after the core network device sends the security response information to the base station, the core network device may further send a NAS security parameter information change indication to the base station, where specific content of the change indication may include changed NAS security parameter information, and the changed NAS security parameter information may be changed NAS security parameter information determined after the UE and/or the core network device detect/detects that the NAS security parameter information currently used between the UE and the MME changes and the MME re-initiates and performs key negotiation to the UE.

Further, after receiving the security parameter information sent by the core network device, the base station may use the security parameter information for subsequent air interface signaling ciphering and integrity protection, data ciphering, or the like. For example, the security parameter information may be used in a procedure for generating a related key by the UE or the MME to derive a key, or used in other access stratum AS security procedures. For example, the base station uses the NAS security parameter information sent by the core network device, and uses a related algorithm to derive an AS key; and the UE performs a same operation, and uses an algorithm known to both the UE and the base station to perform an AS security operation.

Step S206: The base station receives the security response information returned by the core network device, where the security response information includes the security parameter information of the UE and/or the security-deprocessed target data.

Specifically, after receiving the security response information returned by the core network device in step S205, the base station may perform, by using the received security parameter information of the UE, security deprocessing on the NAS security-processed target data, and therefore successfully read the target data reported by the UE; or the base station may directly receive the NAS security-deprocessed target data returned by the core network device, or receive both the security parameter information of the UE and the NAS security-deprocessed target data. This may be set flexibly and is not specifically limited in the present invention.

In a possible implementation, the base station receives the security response information returned by the core network device by using a downlink S1 message. The downlink S1 message may be an initial context setup request such as an initial context setup request, or downlink NAS transport such as DL NAS transport.

In a possible implementation, after the base station receives the security response information returned by the core network device, the base station receives a NAS security parameter information change notification sent by the UE and/or the core network device, so that the base station can obtain latest and valid security parameter information.

In a possible implementation, when receiving the security-processed target data sent by the UE, the base station receives security related information sent by the UE; and when determining that the security related information is inconsistent with security related information locally stored by the base station, the base station performs the step of sending security request information of the UE to the core network device. The security related information may be used as basis information for the base station to determine whether the security parameter information locally stored by the base station needs to be changed. Specific content is not specifically limited in the present invention. Further, when the security response information includes the security parameter information of the UE, that the base station receives the security response information returned by the core network device includes: the base station receives updated non-access stratum NAS security parameter information returned by the core network device; or the base station receives updated access stratum AS security parameter information returned by the core network device, and initiates security negotiation to the UE based on the updated AS security parameter information.

Still further, the present invention provides a solution to a key change problem. To be specific, the base station may receive the security related information sent by the user equipment UE; and when the base station determines that the security related information is inconsistent with the locally stored security related information of the UE, the base station determines that the security parameter information needs to be changed. After determining that the security parameter information needs to be changed, the base station initiates a process of re-obtaining the security parameter information of the UE. The base station re-initiates security negotiation to the UE, and determines the changed access stratum AS security parameter information, so that the UE stores the changed AS security parameter information and/or that the core network device performs security processing by using the changed AS security parameter information; or the base station obtains the updated non-access stratum NAS security parameter information from the core network device; or the base station obtains the updated AS security parameter information from the core network device, and initiates security negotiation to the UE based on the updated AS security parameter information, so that the UE stores the updated AS security parameter information and/or that the core network device performs AS security processing by using the updated AS security parameter information. In addition to sending the security request information after receiving the security-processed target data, the base station may prepare for secure data transmission in advance when no target data is received, that is, receive only security related information sent by the UE, to trigger a subsequent process of re-obtaining the security parameter information and ensure validity of the security parameter information.

In this embodiment of the present invention, a technical problem about how to securely transmit target data to the base station is mainly resolved. To be specific, after the base station receives the NAS security-processed target data sent by the UE, the base station sends the security request information related to security deprocessing of the target data to the core network device, and then receives the related security parameter information returned by the core network device, or directly obtains the target data through parsing. Therefore, security protection is applied to the target data on an air interface.

Figure 3:
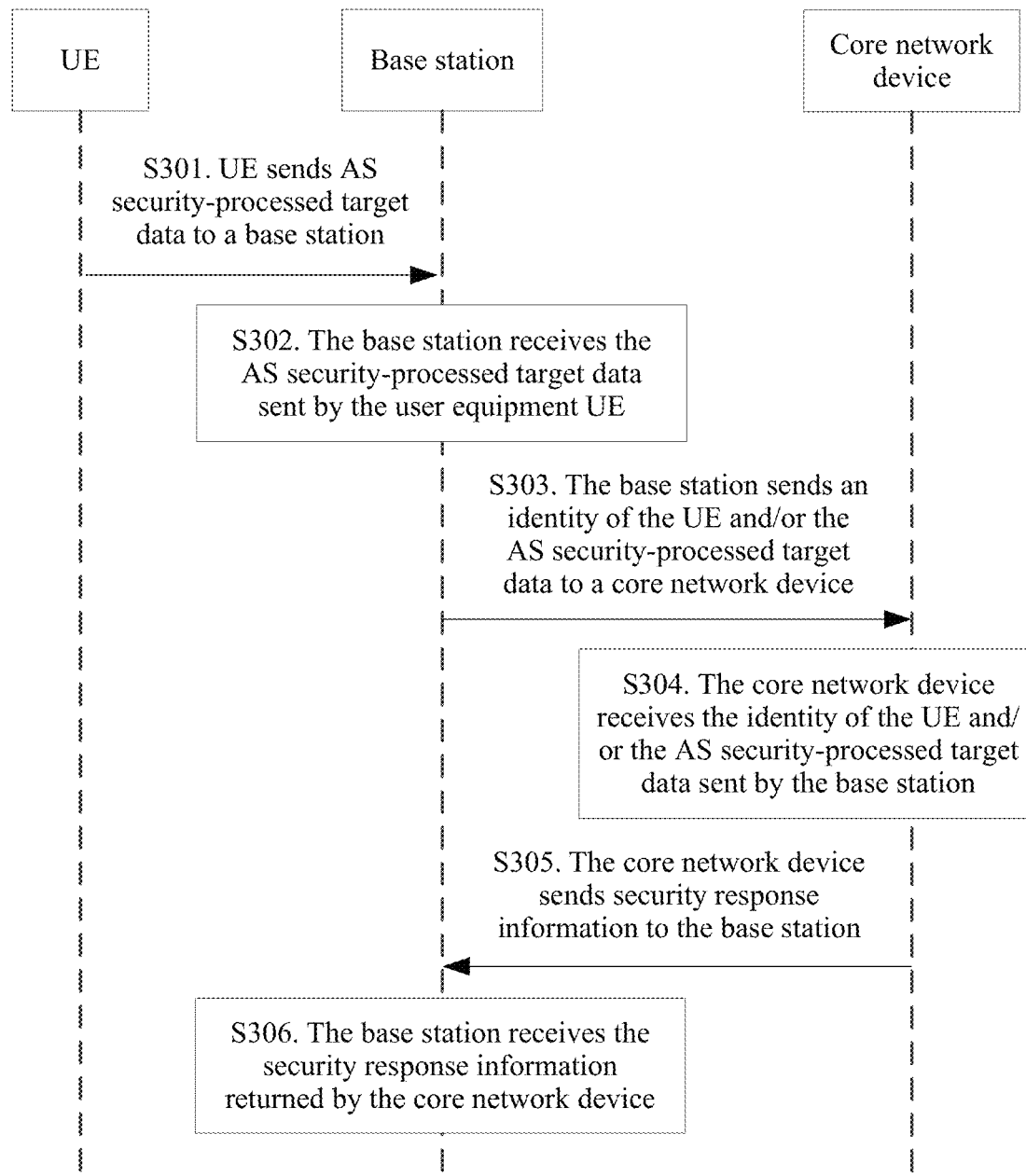
FIG. 3 is a schematic flowchart of another security processing method according to the present invention.

Referring to FIG. 3, FIG. 3 is a schematic flowchart of another security processing method in an embodiment of the present invention. With reference to FIG. 3, the following describes in detail interaction between UE, a base station, and a core network device. As shown in FIG. 3, the method may include the following step S301 to step S306.

Step S301: UE sends AS security-processed target data to a base station.

Specifically, the UE sends the AS security-processed target data to the base station by using uplink RRC signaling or uplink MAC layer signaling. The security-processed target data may be access stratum AS security-ciphered target data, or AS integrity-protected target data, or AS ciphered and AS integrity-protected target data.

In a possible implementation, before the UE sends the AS security-processed target data to the base station, the UE performs AS security processing on the target data by using AS security parameter information, where the AS security parameter information is AS security parameter information determined through key negotiation between the UE and the base station or AS security parameter information stored in the UE. Further, the AS security parameter information may include an AS ciphering key or a related parameter for generating a key and an AS ciphering algorithm, and/or an AS integrity protection key or a related parameter for generating a key and an AS integrity protection algorithm.

In a possible implementation, the UE and the base station store an AS security parameter determined through negotiation between the UE and the base station in a previous connection. After the base station receives the AS security-processed target data, the base station performs a security deprocessing operation on the AS security-processed target data to further obtain the target data.

Further, when the UE is connected to the base station again, the UE sends, to the base station by using uplink signaling such as RRC connection resume, the AS security parameter information stored by the UE. After receiving the AS security parameter information, the base station determines, by comparing the AS security parameter information with the AS security parameter information stored by the base station, whether the AS security parameter information changes, and if the AS security parameter information changes, sends security request information to an MME, and obtains security response information sent by the MME to the base station. Further, the base station may obtain related security parameters in the response information, and trigger an AS SMC procedure, that is, a security negotiation procedure.

Optionally, when the UE is connected to the base station again, the UE sends security-processed data to the base station. If the base station cannot use the stored security information to perform deprocessing, it indicates that the security parameter information changes. In this case, the base station sends security request information to the MME, and obtains security response information sent by the MME to the base station. Further, the base station may obtain related security parameters in the response information, and start to perform an AS SMC procedure, that is, a security negotiation procedure.

In a possible implementation, the UE further sends an AS security parameter information change notification to the base station, where the change notification may be changed AS security parameter information determined after security negotiation is performed again between the UE and the core network device when finding that the currently used AS security parameter information changes. If the AS security parameter information changes, the UE or the MME sends an AS security parameter information change indication to the base station. Optionally, when the UE sends a change indication to the base station, the base station sends security request information to the MME, and obtains security response information sent by the MME to the base station. Further, the base station may obtain related security parameters in the response information, and trigger an AS SMC procedure, that is, a security negotiation procedure. Optionally, when the MME sends a change indication to the base station, the indication message thereof may be an AS related security parameter. The base station uses a related message to perform an AS SMC procedure, that is, a security negotiation procedure. The base station re-initiates the AS SMC procedure, and re-negotiates AS security parameter information. The foregoing method is applicable to AS security parameters stored by the UE and the base station and AS security parameters stored by the UE and the MME.

In a possible implementation, the UE and the MME store AS security parameter information in a previous connection; and when the AS security parameter information changes, the UE performs ciphering or integrity protection by using updated AS security parameter information. The MME indicates, to the base station, that the AS security parameter information changes, and notifies the updated security parameter information to the base station, so that the base station uses the changed AS security parameter information to directly perform deciphering and/or integrity check and/or an AS security operation on other RRC signaling or the like. For example, when an AS security related algorithm used by the base station and the UE does not change, a related parameter for generating an AS key changes. Therefore, the base station may use the security parameter information sent by the MME to obtain a new key, or directly obtain a key from the security parameter information sent by the MME. If the AS security parameter information changed in the UE and the MME is not supported by the base station accessed by the UE, or when the eNB fails to perform a security operation by using the AS security parameter information obtained from the MME, the base station obtain a related security parameter from the MME to perform AS security negotiation again or uses stored related security information to re-initiate an AS security negotiation process to the UE.

In a possible implementation, before the UE sends the access stratum AS security-processed target data to the base station, after the UE establishes a connection to the base station, when the base station learns, from an indication message, that no AS security parameter information is stored in the UE and the core network device, the base station initiates key negotiation to the UE and determines AS security parameter information that needs to be used, so that the UE stores the AS security parameter information and uses the AS security parameter information to perform security processing on the target data that needs to be sent to the base station. Further, when the connection between the UE and the base station is released, the base station sends the AS security parameter information to the core network device for storage, so that when the base station needs to use the related AS security parameter information to perform a data security procedure again next time, the base station may directly obtain the related AS security parameter information from the core network device. Therefore, air interface resources are not wasted unnecessarily, and power consumption on an air interface of the UE (generally not wired connected) is reduced. The security parameter information sent by the base station to the core network device may be carried in uplink S1-AP signaling, for example, UE context release complete, S1-AP UE deactivate context Ack, or Uplink NAS transport.

In a possible implementation, after the base station sends the AS security parameter information to the core network device for storage, when the base station receives an AS security parameter information change indication, the base station re-initiates key negotiation to the UE and determines changed AS security parameter information, so that the UE stores the changed AS security parameter information and uses the changed AS security parameter information to perform security processing, where the security parameter information change indication is a change indication sent to the base station when the UE and/or the core network device find/finds that the AS security parameter information changes. Further, the AS security parameter information updated through negotiation is sent to the core network device for storage. Still further, the changed AS security parameter information is sent, by using sent security request information, to the core network device for storage, for example, signaling such as UE context release complete, S1-AP UE deactivate context Ack, or DL NAS transport.

In a possible implementation, for example, the target data is a measurement report, and the UE encapsulates the measurement report or location information into a NAS PDU carried in uplink RRC signaling, where specific signaling may be RRC connection setup complete, UE location information, the measurement report, or the like, and uses NAS security parameter information to perform security processing. After receiving the NAS PDU, the base station forwards the NAS PDU including the measurement report or the location information to the core network device by using S1-AP signaling, where specific signaling may be an initial UE message, UL NAS transport, or the like. After receiving the NAS PDU, the core network device performs security deprocessing on the NAS PDU and obtains the measurement report or the location information, and transmits the measurement report or the location information to the base station by using downlink S1 signaling, where specific signaling may be an initial context setup request, downlink DL NAS transport, or the like. The aforementioned signaling is not limited.

In a possible implementation, when a plurality of data packets need to be transmitted, the data packets may be carried in a piggyback manner. For example, the AS security parameter information may be carried in DL NAS transport of an S1 interface in the piggyback manner. On the air interface, if AS security needs to be negotiated, the AS security parameter information may be carried in a DL direct transfer message in the piggyback manner by using AS SMC signaling, and a response message may be acknowledged in a UL direct transfer message without requiring dedicated signaling. Therefore, power consumption is reduced.

Step S302: The base station receives the AS security-processed target data sent by the user equipment UE.

Specifically, the base station receives the security-processed target data sent by the UE by using the uplink RRC signaling or the uplink MAC signaling in step S301.

Step S303: The base station sends an identification of the UE and/or AS security-processed target data to a core network device.

Specifically, the base station may send the identification of the UE and/or the AS security-processed target data to the core network device by using the S1 interface and using an initial UE message or other uplink signaling of the S1 interface, such as a UL transport message. In the prior art, a base station (e.g. eNB) may directly obtain a measurement report through parsing after receiving target data such as the measurement report; because security parameter information used for AS security deprocessing of the target data is determined through negotiation between UE and the base station, in this case, the base station can directly perform parsing by using the security parameter information obtained through negotiation between the base station and the UE. However, a difference in this embodiment of the present invention lies in that, the security parameter information determined through negotiation between the UE and the base station is stored in the UE and the MME (including storage after the security parameter information changes). Therefore, when the UE needs to perform data transmission with the base station again, there is no need to perform a re-negotiation procedure to obtain security parameter information. Instead, to complete secure transmission between the UE and the base station, the base station only needs to obtain stored valid security parameter information from the MME, and the UE stores valid security parameter information. Therefore, power consumption on the air interface between the UE and the base station is reduced.

It may be understood that, content of the security request information may be an identification for identifying the UE, and the identification may allow the MME to correspondingly find security parameter information matching the identification. However, it may also be understood that, the AS security-processed target data that needs to be read may be directly sent to the MME, so that the MME performs security deprocessing and then returns security-deprocessed target data to the base station or returns both the security parameter information and the security-deprocessed target data to the base station, so long as the base station can finally read the AS security-processed target data smoothly. Identification information of the UE may be identification information such as S-TMSI, eNB UE S1AP ID, MME UE S1AP IP, or IMSI, so long as the base station can finally read the security-processed target data smoothly.

In a possible implementation, the UE and the MME store the AS security parameter information; when the UE is connected to the base station again, the UE sends the AS security-processed target data to the base station by using an RRC connection complete message; after receiving the data, the base station sends an initial UE message to the MME; after receiving the message, the MME sends AS security parameter information to the base station by using a piece of downlink S1 signaling; after receiving the message, the base station performs security deprocessing on the received AS security-processed data by using the received security parameter information, and obtains the target data. The forementioned signaling is only an example and is not limited. Optionally, likewise, when the UE and the MME store the AS security parameter information, if the base station obtains, before sending the security processing data, the AS security parameter information from the MME by using downlink signaling, the base station stores the AS security parameter information; when uplink ciphered data arrives, security deprocessing may be performed on the data by using the AS security parameter information; and when downlink data arrives, AS security processing may be performed.

In a possible implementation, the UE sends the target data (such as the measurement report or location information) to the base station by using a MAC CE in uplink signaling, and the base station may obtain the target data after reception. Optionally, related operations such as ciphering may be performed on the target data by using a message ID in RRC signaling.

In a possible implementation, before sending the security response information to the base station, the core network device receives AS security parameter information of the UE sent by the base station, where the AS security parameter information is AS security parameter information determined after the base station initiates key negotiation to the UE when the base station detects that neither the UE nor the core network device stores AS security parameter information after a connection is established between the UE and the base station. That is, during initial negotiation, the UE and the MME do not store AS security parameter information yet. Therefore, after the initial security negotiation, valid AS security parameter information may be sent to the MME for storage.

Step S304: The core network device receives the identification of the UE and/or the AS security-processed target data sent by the base station.

Specifically, the core network device MME may receive, through the S1 interface, the identification of the UE and/or the AS security-processed target data sent by the base station in step S303.

Step S305: The core network device sends security response information to the base station, where the security response information includes security parameter information of the UE and/or security-deprocessed target data.

In a possible implementation, when the security response information sent by the core network device to the base station includes an AS security parameter, specifically, the AS security parameter may include an AS ciphering key or a related parameter for generating a key and an AS ciphering algorithm, and/or an AS integrity protection key or a related parameter for generating a key and an AS integrity protection algorithm.

In a possible implementation, the security response information sent by the core network device to the base station includes target data obtained after the AS security-processed target data is AS security-deciphered by using the AS security parameter information, or AS integrity-checked target data, or AS security-deciphered and AS integrity-checked target data.

In a possible implementation, the core network device receives and stores the AS security parameter information of the UE or the changed AS security parameter information in the security request information sent by the base station. The base station may send the AS security parameter information or the changed AS security parameter information to the core network device by using RRC connection setup complete or other uplink RRC signaling.

In a possible implementation, when detecting that the AS security parameter information changes, the core network device sends a change indication to the base station, so that the base station re-initiates a security negotiation process to the UE to generate changed valid security parameter information.

In a possible implementation, the base station receives an AS security parameter of the UE returned by the core network device, where the AS security parameter may include an AS ciphering key or a related parameter for generating a key and an AS ciphering algorithm, and/or an AS integrity protection key or a related parameter for generating a key and an AS integrity protection algorithm.

In a possible implementation, because a NAS related security parameter is definitely generated when an AS related security parameter is generated in the prior art, AS security parameter information may be derived by using a NAS security parameter generated in this method step, and is stored in the UE and the MME; a ciphering algorithm and a protection algorithm used by the base station and the UE for air interface security may be a NAS algorithm, or may be a newly set algorithm for the Cellular Internet of Things (CIOT); if the NAS algorithm is used, an AS SMC procedure does not need to be performed during initial connection setup; if another algorithm is used, negotiation may be performed by using a NAS SMC, or negotiation may be performed by using an AS SMC. A beneficial effect of this method step is: there is no need to separately generate two keys in this embodiment, AS security parameter information can be derived by using generated NAS security parameter information, and therefore, signaling and power consumption are reduced.

Step S306: The base station receives the security response information returned by the core network device, where the security response information includes the security parameter information of the UE and/or the security-deprocessed target data.

Specifically, after receiving the security response information returned by the core network device in step S305, the base station may perform, by using the received security parameter information of the UE, security deprocessing on the security-processed target data, and therefore successfully read the target data reported by the UE; or the base station may directly receive the AS security-deprocessed target data returned by the core network device, or receive both the security parameter information of the UE and/or the AS security-deprocessed target data. This may be set flexibly and is not specifically limited in the present invention.

In a possible implementation, the base station receives the security response information returned by the core network device by using a downlink S1 message.

In a possible implementation, after the base station receives the security-processed target data sent by the user equipment UE, the base station may further receive a security parameter information change indication sent by the UE, or receive a security parameter information change indication sent by the core network device. After receiving the security parameter information change indication, the base station initiates a process of re-obtaining security parameter information of the UE. Specifically, the base station may re-initiate security negotiation to the UE, and determine changed AS security parameter information; or the base station obtains updated NAS security parameter information from the core network device; or the base station obtains updated AS security parameter information from the core network device, and initiates security negotiation to the UE based on the updated AS security parameter information. In this method step, the base station may not only actively request security parameter information, but also passively receive a security parameter information change indication sent by the UE or the core network device. Therefore, validity of security parameter information can be ensured in a process of data transmission between the UE and the base station.

In this embodiment of the present invention, a technical problem about how to securely transmit target data to the base station while reducing air interface signaling overheads or power consumption is mainly resolved. To be specific, during initial access, after a connection is established between the UE and the base station, AS security protection in the prior art is applied. When the connection is released, the base station sends the AS security related security parameter information used at this time to the core network device for storage. When a connection is reestablished and the UE has target data to send, the base station initiates the security request information previously stored and related to security deprocessing of the target data to the core network device, and then receives the related security parameter information returned by the core network device, or directly obtains the target data through parsing. Therefore, a procedure for negotiating the security parameter information by the base station and the UE by using an AS SMC can be avoided, not only AS security protection is implemented, but also power consumption is reduced.

For better implementing the foregoing method embodiments in the embodiments of the present invention, the present invention further provides a related base station and user equipment configured to implement the foregoing method embodiments in cooperation. The following provides detailed descriptions with reference to schematic diagrams of a related base station, a core network device, and user equipment shown in FIG. 4, FIG. 5, FIG. 6, and FIG. 7 according to the present invention.

Figure 4:
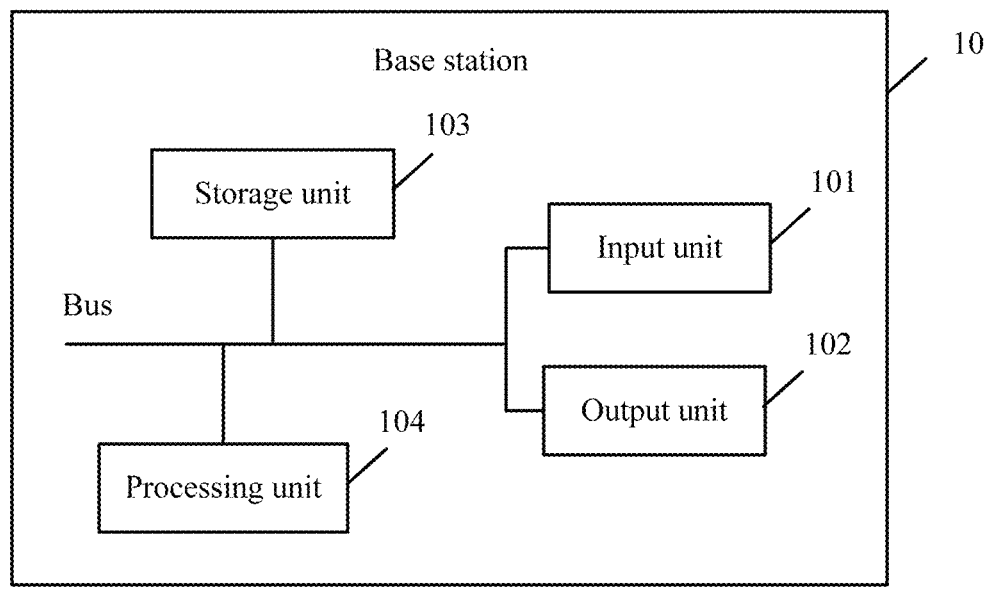
FIG. 4 is a schematic structural diagram of a base station according to the present invention.

Referring to FIG. 4, FIG. 4 is a schematic structural diagram of base station 10 provided by an embodiment of the present invention. The base station 10 includes an input unit 101, an output unit 102, a storage unit 103, and a processing unit 104. In some embodiments of the present invention, the input unit 101, the storage unit 103, and the processing unit 104 may be connected by a bus or in another manner, where the connection by a bus is used as an example in FIG. 4. The processing unit 104 invokes program code stored in the storage unit 103 to perform the following operations:

receiving, by the input unit 101, security-processed target data sent by user equipment UE;

sending security request information of the UE to a core network device through the output unit 102; and receiving, through the input unit 101, security response information returned by the core network device, where the security response information includes security parameter information of the UE and/or security-deprocessed target data.

Optionally, the processing unit 104 is configured to: when receiving, through the input unit 101, the security-processed target data sent by the UE, receive, through the input unit 101, security related information sent by the UE; and when the base station determines that the security related information is inconsistent with security related information locally stored by the base station, perform the step of sending security request information of the UE to a core network device through the output unit 102.

Optionally, when the security response information includes the security parameter information of the UE, that the processing unit 104 is configured to receive, through the input unit 101, security response information returned by the core network device is specifically:

receiving, through the input unit 101, updated access stratum AS security parameter information returned by the core network device, and initiating security negotiation to the UE based on the updated AS security parameter information.

Optionally, the receiving, by the processing unit 104 through the input unit 101, security-processed target data sent by user equipment UE includes:

receiving, through the input unit 101, the security-processed target data sent by the UE by using uplink NAS signaling or uplink RRC signaling or uplink MAC layer signaling.

Optionally, the security-processed target data includes non-access stratum NAS security-ciphered target data, or NAS integrity-protected target data, or NAS ciphered and NAS integrity-protected target data; or the security-processed target data includes access stratum AS security-ciphered target data, or AS integrity-protected target data, or AS ciphered and AS integrity-protected target data.

Optionally, the sending, by the processing unit 104, security request information of the UE to a core network device through the output unit 102 includes:

sending, by using an uplink S1 message, the security request information of the UE to the core network device through the output unit 102.

Optionally, the sending, by the processing unit 104, security request information of the UE to a core network device through the output unit 102 includes:

sending an identification of the UE and/or NAS security-processed target data to the core network device through the output unit 102; or sending an identification of the UE and/or AS security-processed target data to the core network device through the output unit 102.

Optionally, when the security response information includes the security parameter information of the UE, the processing unit 104 is further configured to:

after receiving, through the input unit 101, the security response information returned by the core network device, perform security deprocessing on the security-processed target data based on the security parameter information in the security response information.

Optionally, the receiving, by the processing unit 104 through the input unit 101, security response information returned by the core network device includes:

receiving, by using the input unit 101, the security response information returned by the core network device by using a downlink S1 message.

Optionally, the receiving, by the processing unit 104 through the input unit 101, security parameter information in security response information returned by the core network device includes:

receiving, through the input unit 101, a NAS security parameter of the UE returned by the core network device, where the NAS security parameter includes a NAS ciphering key or a related parameter for generating a key and a NAS ciphering algorithm, and/or a NAS integrity protection key or a related parameter for generating a key and a NAS integrity protection algorithm; or receiving, through the input unit 101, an AS security parameter of the UE returned by the core network device, where the AS security parameter includes an AS ciphering key or a related parameter for generating a key and an AS ciphering algorithm, and/or an AS integrity protection key or a related parameter for generating a key and an AS integrity protection algorithm.

Optionally, the receiving, by the processing unit 104 through the input unit 101, security-deprocessed target data in security response information returned by the core network device includes:

receiving, through the input unit 101, target data which is NAS security-deciphered, or NAS integrity-checked, or NAS security-deciphered and NAS integrity-checked based on the NAS security-processed target data, returned by the core network device; or receiving, through the input unit 101, target data which is AS security-deciphered, or AS integrity-checked, or AS security-deciphered and AS integrity-checked based on the AS security-processed target data, returned by the core network device.

Optionally, the performing, by the processing unit, security deprocessing on the security-processed target data based on the security parameter information in the security response information includes:

performing NAS deciphering, or NAS integrity check, or NAS deciphering and NAS integrity check on the NAS security-processed target data based on NAS security parameter information returned by the core network device; or performing AS deciphering, or AS integrity check, or AS deciphering and AS integrity check on the AS security-processed target data based on AS security parameter information returned by the core network device.

Optionally, the processing unit 104 is further configured to: before receiving, through the input unit 101, the security-processed target data sent by the user equipment UE, when a connection between the UE and the base station is released, send, through the output unit 102, the AS security parameter information to the core network device for storage; or send, by using security request information sent by the output unit 102 or interface signaling between the base station and the core network device, the updated AS security parameter information to the core network device for storage.

Optionally, the processing unit 104 is configured to: after receiving, through the input unit 101, the security-processed target data sent by the user equipment UE, receive, through the input unit 101, a security parameter information change indication sent by the UE; or receive, through the input unit 101, a security parameter information change indication sent by the core network device.

Optionally, the processing unit 104 is further configured to: after receiving the security parameter information change indication through the input unit 101, initiate, through the output unit 102, a process of re-obtaining security parameter information of the UE.

Optionally, that the processing unit 104 is configured to initiate, through the output unit 102, a process of re-obtaining security parameter information of the UE is specifically:

re-initiating security negotiation to the UE through the output unit 102, and determining changed AS security parameter information; or obtaining updated NAS security parameter information from the core network device through the input unit 101; or obtaining the updated AS security parameter information from the core network device through the input unit 101, and initiating security negotiation to the UE based on the updated AS security parameter information.

It may be understood that, for functions of all units in the base station 10, reference may be made to specific implementations in the foregoing method embodiments in FIG. 2 and FIG. 3. Details are not further described herein.

Figure 5:
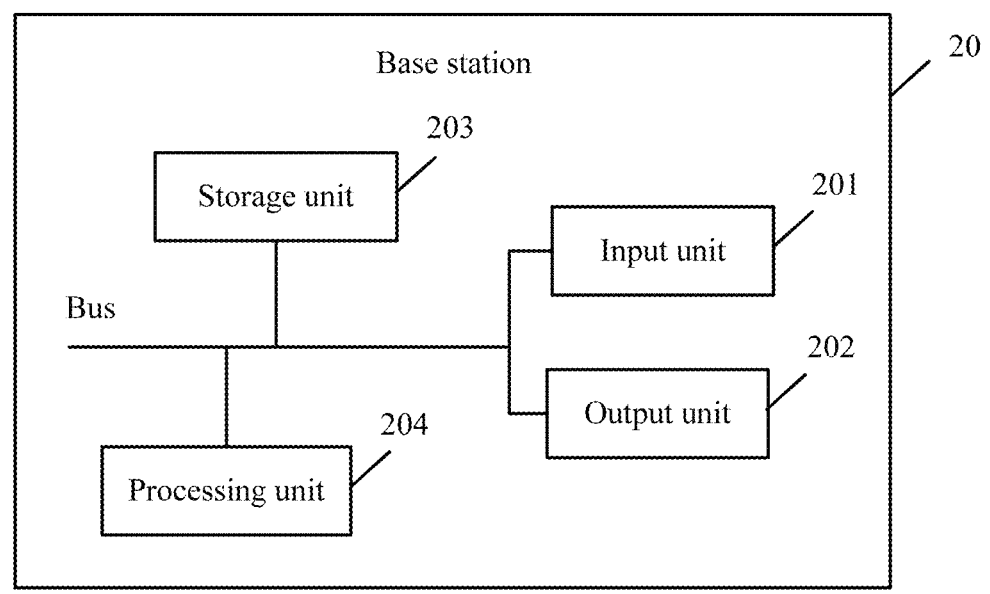
FIG. 5 is a schematic structural diagram of another embodiment of a base station according to the present invention.

FIG. 5 is a schematic structural diagram of a base station 20 provided by an embodiment of the present invention. The base station 20 may include an input unit 201, an output unit 202, a storage unit 203, and a processing unit 204 (there may be one or more processing units 204, and one processing unit is used as an example in FIG. 5). The input unit 201, the output unit 202, the storage unit 203, and the processing unit 204 are connected to a bus 205 respectively. The storage unit 203 stores a group of security processing program code, and the processing unit 204 is configured to invoke the security processing program code stored in the storage unit 203 to perform the following operations:

receiving, through the input unit 201, security related information sent by user equipment UE; and when the base station determines that the security related information is inconsistent with locally stored security related information of the UE, determining that security parameter information needs to be changed.

Optionally, the processing unit 204 is further configured to: after determining that the security parameter information needs to be changed, initiate, through the output unit 202, a process of re-obtaining security parameter information of the UE.

Optionally, that the processing unit 204 is configured to initiate, through the output unit 202, a process of re-obtaining security parameter information of the UE is specifically:

re-initiating security negotiation to the UE through the output unit 202, and determining changed access stratum AS security parameter information, so that the UE stores the changed AS security parameter information and/or that a core network device performs security processing by using the changed AS security parameter information; or obtaining updated non-access stratum NAS security parameter information from a core network device through the input unit 201; or obtaining updated AS security parameter information from a core network device through the input unit 201, and initiating security negotiation to the UE based on the updated AS security parameter information, so that the UE stores the updated AS security parameter information and/or that the core network device performs AS security processing by using the updated AS security parameter information.

It may be understood that, for functions of all units in the base station 20, reference may be made to specific implementations in the foregoing method embodiments in FIG. 2 and FIG. 3. Details are not further described herein.

Figure 6:
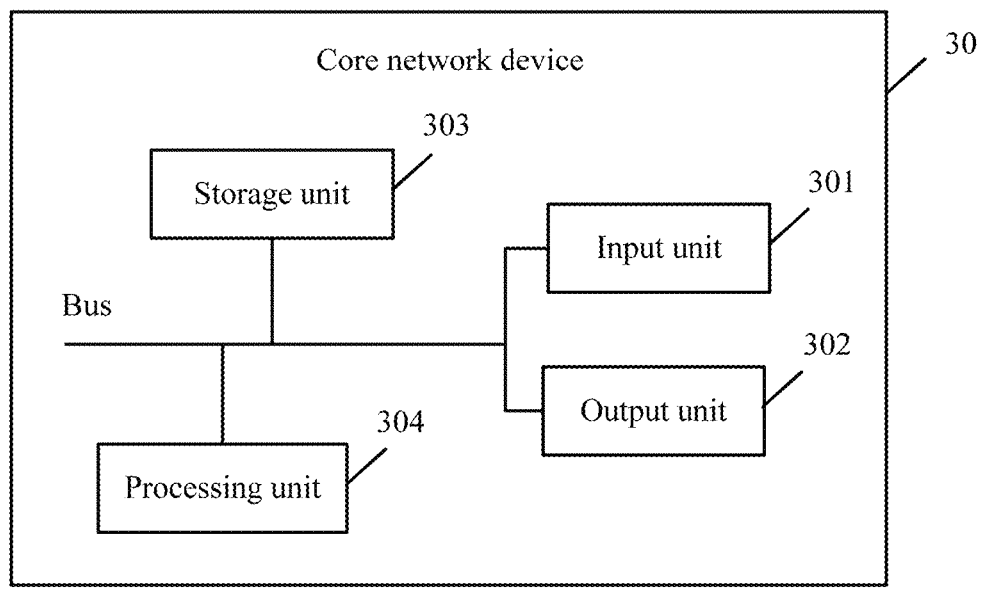
FIG. 6 is a schematic structural diagram of a core network device according to the present invention.

Referring to FIG. 6, FIG. 6 is a schematic structural diagram of core network device 30 provided by an embodiment of the present invention. The core network device 30 includes an input unit 301, an output unit 302, a storage unit 303, and a processing unit 304. In some embodiments of the present invention, the input unit 301, the storage unit 303, and the processing unit 304 may be connected by a bus or in another manner, where the connection by a bus is used as an example in FIG. 6. The processing unit 304 invokes program code stored in the storage unit 303 to perform the following operations:

receiving, through the input unit 301, security request information of user equipment UE sent by a base station; and sending security response information to the base station through the output unit 302, where the security response information includes security parameter information of the UE and/or security-deprocessed target data.

Optionally, that the processing unit 304 is configured to receive, through the input unit 301, security request information of user equipment UE sent by a base station includes:

receiving, through the input unit 301, an identification of the UE and/or the non-access stratum NAS security-processed target data, sent by the base station; or receiving, through the input unit 301, an identification of the UE and/or the access stratum AS security-processed target data, sent by the base station.

Optionally, that the processing unit 304 is configured to send security parameter information in security response information to the base station through the output unit 302 includes:

sending a NAS security parameter of the UE to the base station through the output unit 302, where the NAS security parameter includes a NAS ciphering key or a related parameter for generating a key and a NAS ciphering algorithm, and/or a NAS integrity protection key or a related parameter for generating a key and a NAS integrity protection algorithm; or sending an AS security parameter of the UE to the base station through the output unit 302, where the AS security parameter includes an AS ciphering key or a related parameter for generating a key and an AS ciphering algorithm, and/or an AS integrity protection key or a related parameter for generating a key and an AS integrity protection algorithm.

Optionally, that the processing unit 304 is configured to send security-deprocessed target data in security response information to the base station through the output unit 302 includes:

sending, to the base station through the output unit 302, target data obtained after the security-processed target data is NAS security-deciphered by using NAS security parameter information, or NAS integrity-checked target data, or NAS security-deciphered and NAS integrity-checked target data; or sending, to the base station through the output unit 302, target data obtained after the security-processed target data is AS security-deciphered by using AS security parameter information, or AS integrity-checked target data, or AS security-deciphered and AS integrity-checked target data.

Optionally, the processing unit 304 is further configured to:

after sending the security response information to the base station through the output unit 302, further send a NAS security parameter information change indication to the base station through the output unit 302, where the change indication is changed NAS security parameter information determined after security negotiation is performed again between the UE and the core network device.

Optionally, the processing unit 304 is further configured to:

receive, through the input unit 301, the AS security parameter information of the UE sent by the base station, where the AS security parameter information is AS security parameter information determined after the base station initiates security negotiation to the UE after a connection is established between the UE and the base station; or receive, through the input unit 301, the AS security parameter information or changed AS security parameter information that is stored by the UE and sent by the base station by using the security request information or interface signaling from the base station to the core network device, and store the AS security parameter information or the changed AS security parameter information.

Optionally, the processing unit 304 is further configured to:

when the core network device detects that the AS security parameter information changes, send a security parameter information change indication to the base station through the output unit 302.

It may be understood that, for functions of all units in the core network device 30, reference may be made to specific implementations in the foregoing method embodiments in FIG. 2 and FIG. 3. Details are not further described herein.

Figure 7:
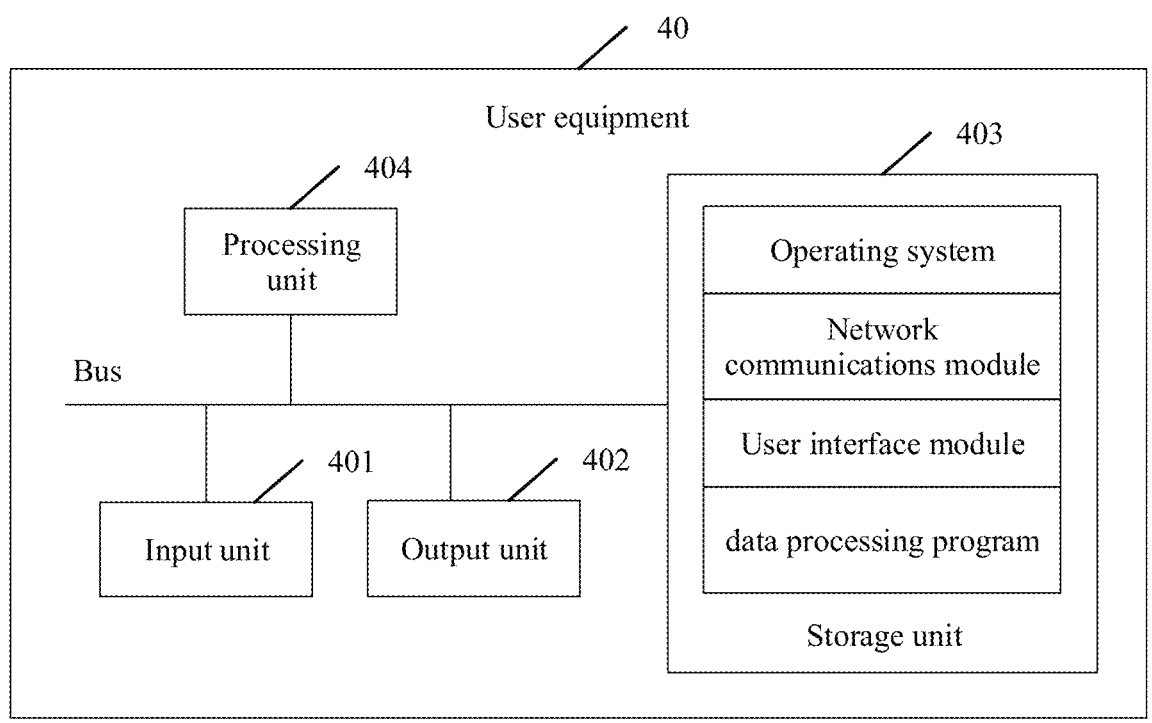
FIG. 7 is a schematic structural diagram of user equipment UE according to the present invention.

Referring to FIG. 7, FIG. 7 is a schematic structural diagram of user equipment UE 40 provided by an embodiment of the present invention. The UE 40 may include an input unit 401, an output unit 402, a storage unit 403, and a processing unit 404. In some embodiments of the present invention, a bus is configured to implement communications connections between the components; the input unit 401 may be specifically a touch panel of the terminal, including a touchscreen configured to detect an operation instruction on the touch panel of the terminal; the output unit 402 may include a display of the terminal; the storage unit 403 may be a high-rate RAM memory, or may be a non-volatile memory (non-volatile memory), for example, at least one magnetic disk memory; and optionally, the storage unit 403 may also be a memory apparatus far away from the processing unit 404. As shown in FIG. 7, the storage unit 403 used as a computer display medium may include an operating system, a network communications module, a user interface module, and a data processing program.

The processing unit 404 of the UE in FIG. 7 invokes program code stored in the storage unit 403 to perform the following operations:

sending non-access stratum NAS security-processed target data to a base station through the output unit 402, where the NAS security-processed target data includes NAS security-ciphered target data, or NAS integrity-protected target data, or NAS ciphered and NAS integrity-protected target data; or sending access stratum AS security-processed target data to a base station through the output unit 402, where the AS security-processed target data includes AS security-ciphered target data, or AS integrity-protected target data, or AS ciphered and AS integrity-protected target data.

Optionally, that the processing unit 404 is configured to send NAS security-processed target data to a base station through the output unit 402 is specifically:

sending, by using uplink NAS signaling or uplink RRC signaling or uplink MAC layer signaling, the NAS security-processed target data to the base station through the output unit 402.

Optionally, that the processing unit 404 is configured to send AS security-processed target data to a base station through the output unit 402 includes:

sending, by the UE by using uplink RRC signaling or uplink MAC layer signaling, the AS security-processed target data to the base station.

Optionally, the processing unit 404 is further configured to:

before sending the NAS security-processed target data to the base station through the output unit 402, perform NAS security processing on the target data by using NAS security parameter information, where the NAS security parameter information is NAS security parameter information determined through security negotiation between the UE and a core network device, and the NAS security parameter information includes a NAS ciphering key or a related parameter for generating a key and a NAS ciphering algorithm, and/or a NAS integrity protection key or a related parameter for generating a key and a NAS integrity protection algorithm.

Optionally, the processing unit 404 is further configured to:

before sending the access stratum AS security-processed target data to the base station through the output unit 402, perform AS security processing on the target data by using AS security parameter information, where the AS security parameter information is AS security parameter information determined through security negotiation between the UE and the base station or AS security parameter information stored in the UE, and the AS security parameter information includes an AS ciphering key or a related parameter for generating a key and an AS ciphering algorithm, and/or an AS integrity protection key or a related parameter for generating a key and an AS integrity protection algorithm.

Optionally, the processing unit 404 is further configured to:

send a NAS security parameter information change indication to the base station through the output unit 402, where the change indication is changed NAS security parameter information determined after security negotiation is performed again between the UE and the core network device.

Optionally, the processing unit 404 is further configured to:

send an AS security parameter information change indication to the base station through the output unit 402, where the change indication is changed AS security parameter information determined after security negotiation is performed again between the UE and the core network device.

It may be understood that, for functions of all units in the user equipment UE 40, reference may be made to specific implementations in the foregoing method embodiments in FIG. 2 and FIG. 3. Details are not further described herein.

It should be noted that the foregoing method embodiments of the present invention may be applied to a processor, or may be implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may further be a general processor, a digital signal processor (DSP), an application-specific integrated circuit (ASIC), a field programmable gate array (FPGA), another programmable logic device, a discrete gate, a transistor logic device, or a discrete hardware component. All methods, steps, and logical diagrams disclosed in this embodiment of the present invention may be implemented or performed. The general purpose processor may be a microprocessor or the processor may be any normal processor, or the like. Steps of the methods disclosed in the embodiments of the present invention may be directly performed and completed by a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It may be understood that, the memory in the embodiments of the present invention may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. For example but not for limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and method described in this specification aims to include but is not limited to these memories and any memory of another proper type.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
  receiving, by a base station, security-processed target data from user equipment (UE), wherein the security-processed target data is target data having been processed by a security algorithm and is not readable by the base station;
  sending, by the base station, security request information of the UE and the security-processed target data to a core network device to request the core network to process the security-processed target data after the security-processed target data having been received; and receiving, by the base station, security response information returned by the core network device, wherein the security response information comprises security parameter information for the UE and comprises security-deprocessed target data, wherein the security-deprocessed target data is obtained by the core network device by applying a security-deprocess to the security-processed target data.

2. The method according to claim 1, wherein receiving, by the base station, the security-processed target data from the UE comprises:

receiving, by the base station, the security-processed target data from the UE through uplink non-access stratum (NAS) signaling or uplink radio resource control (RRC) signaling or uplink Media Access Control (MAC) layer signaling.

3. The method according to claim 1, wherein the security-processed target data comprises NAS ciphered target data, or NAS integrity-protected target data, or NAS ciphered and NAS integrity-protected target data; or the security-processed target data comprises access stratum (AS) ciphered target data, or AS integrity-protected target data, or AS ciphered and AS integrity-protected target data.

4. The method according to claim 1, wherein sending, by the base station, security request information of the UE to the core network device comprises:

sending, by the base station, the security request information of the UE to the core network device by using an uplink S1 interface message.

5. The method according to claim 1, wherein sending, by the base station, security request information of the UE to the core network device comprises:

sending, by the base station, an identification of the UE or NAS security-processed target data to the core network device; or sending, by the base station, an identification of the UE or AS security-processed target data to the core network device.

6. The method according to claim 1, wherein receiving, by the base station, the security response information returned by the core network device comprises:

receiving, by the base station, the security response information returned by the core network device by using a downlink S1 interface message.

7. The method according to claim 1, wherein receiving, by the base station, the security parameter information in security response information returned by the core network device comprises:

receiving, by the base station, a NAS security parameter of the UE returned by the core network device, wherein the NAS security parameter comprises a NAS ciphering key or a related parameter for generating a key and a NAS ciphering algorithm, and/or a NAS integrity protection key or a related parameter for generating a key and a NAS integrity protection algorithm; or receiving, by the base station, an AS security parameter of the UE returned by the core network device, wherein the AS security parameter comprises an AS ciphering key or a related parameter for generating a key and an AS ciphering algorithm, or an AS integrity protection key or a related parameter for generating a key and an AS integrity protection algorithm.

8. An apparatus, comprising a memory, and a processor, wherein the memory is configured to store program code, and the processor is configured to invoke the program code stored in the memory to perform:

receiving security-processed target data from UE, wherein the security-processed target data is target data having been processed by a security algorithm and is not readable by the base station;

sending security request information of the UE and the security-processed target data to a core network device to request the core network to process the security-processed target data after the security-processed target data having been received; and receiving security response information returned by the core network device, wherein the security response information comprises security parameter information for the UE and comprises security-deprocessed target data, wherein the security-deprocessed target data is obtained by the core network device by applying a security-deprocess to the security-processed target data.

9. The apparatus according to claim 8, wherein receiving, by the base station, the security-processed target data from the UE comprises:

receiving the security-processed target data from the UE through uplink NAS signaling or uplink RRC signaling or uplink MAC layer signaling.

10. The apparatus according to claim 8, wherein the security-processed target data comprises NAS security-ciphered target data, or NAS integrity-protected target data, or NAS ciphered and NAS integrity-protected target data; or the security-processed target data comprises AS security-ciphered target data, or AS integrity-protected target data, or AS ciphered and AS integrity-protected target data.

11. The apparatus according to claim 8, wherein the sending security request information of the UE to a core network device comprises:

sending, by using an uplink S1 interface message, the security request information of the UE to the core network device.

12. The apparatus according to claim 8, wherein sending, by the base station, security request information of the UE to the core network device comprises:

sending an identification of the UE and/or NAS security-processed target data to the core network device; or sending an identification of the UE and/or AS security-processed target data to the core network device.

13. The apparatus according to claim 8, wherein receiving the security response information returned by the core network device comprises:

receiving the security response information returned by the core network device by using a downlink S1 interface message.

14. The apparatus according to claim 8, wherein receiving the security parameter information in the security response information returned by the core network device comprises:

receiving a NAS security parameter of the UE returned by the core network device, wherein the NAS security parameter comprises a NAS ciphering key or a related parameter for generating a key and a NAS ciphering algorithm, and/or a NAS integrity protection key or a related parameter for generating a key and a NAS integrity protection algorithm; or receiving an AS security parameter of the UE returned by the core network device, wherein the AS security parameter comprises an AS ciphering key or a related parameter for generating a key and an AS ciphering algorithm, or an AS integrity protection key or a related parameter for generating a key and an AS integrity protection algorithm.

15. A non-transitory computer readable storage medium, comprising computer program codes which when executed by a computer processor cause the compute processor to:
receive security-processed target data from UE, wherein the security-processed target data is target data having been processed by a security algorithm and is not readable by a base station;
send security request information of the UE and the security-processed target data to a core network device to request the core network to process the security-processed target data after the security-processed target data having been received; and
receive security response information returned by the core network device, wherein the security response information comprises security parameter information for the UE and comprises security-deprocessed target data, wherein the security-deprocessed target data is obtained by the core network device by applying a security-deprocess to the security-processed target data.

16. The non-transitory computer readable storage medium according to claim 15, wherein the receiving security-processed target data from UE comprises:
receiving the security-processed target data from the UE through uplink NAS signaling or uplink RRC signaling or uplink MAC layer signaling.

17. The non-transitory computer readable storage medium according to claim 15, wherein the security-processed target data comprises NAS ciphered target data, or NAS integrity-protected target data, or NAS ciphered and NAS integrity-protected target data; or
the security-processed target data comprises AS ciphered target data, or AS integrity-protected target data, or AS ciphered and AS integrity-protected target data.

18. The non-transitory computer readable storage medium according to claim 15, wherein the sending security request information of the UE to a core network device comprises:
sending the security request information of the UE to the core network device by using an uplink S1 interface message.

19. The non-transitory computer readable storage medium according to claim 15, wherein the sending security request information of the UE to a core network device comprises:
sending an identification of the UE or NAS security-processed target data to the core network device; or
sending an identification of the UE or AS security-processed target data to the core network device.

20. The non-transitory computer readable storage medium according to claim 15, wherein the receiving security response information returned by the core network device comprises:
receiving the security response information returned by the core network device by using a downlink S1 interface message;
wherein the receiving security parameter information in security response information returned by the core network device comprises:
receiving a NAS security parameter of the UE returned by the core network device, wherein the NAS security parameter comprises a NAS ciphering key or a related parameter for generating a key and a NAS ciphering algorithm, and/or a NAS integrity protection key or a related parameter for generating a key and a NAS integrity protection algorithm; or
receiving an AS security parameter of the UE returned by the core network device, wherein the AS security parameter comprises an AS ciphering key or a related parameter for generating a key and an AS ciphering algorithm, and/or an AS integrity protection key or a related parameter for generating a key and an AS integrity protection algorithm.

* * * * *